United States Patent
Ho

(10) Patent No.: US 8,711,672 B2
(45) Date of Patent: Apr. 29, 2014

(54) WIRELESS COMMUNICATION SYSTEM USING PILOT ALLOCATION, METHOD AND PILOT PATTERN THEREOF

(75) Inventor: Tsung-Lien Ho, Taipei County (TW)

(73) Assignee: Acer Incorporated, Taipei County (TW)

( * ) Notice: Subject to any disclaimer, the term of this patent is extended or adjusted under 35 U.S.C. 154(b) by 652 days.

(21) Appl. No.: 12/556,350

(22) Filed: Sep. 9, 2009

(65) Prior Publication Data

US 2010/0166090 A1 Jul. 1, 2010

Related U.S. Application Data

(60) Provisional application No. 61/193,848, filed on Dec. 30, 2008.

(51) Int. Cl.
*H04J 11/00* (2006.01)
*H04L 5/00* (2006.01)
*H04L 25/03* (2006.01)

(52) U.S. Cl.
CPC ............ *H04L 5/0048* (2013.01); *H04L 5/0023* (2013.01); *H04L 2025/03426* (2013.01); *H04L 5/0005* (2013.01)
USPC ........................................................ 370/208

(58) Field of Classification Search
CPC .................................................. H04L 5/0048
USPC ........................................................ 370/208
See application file for complete search history.

(56) References Cited

U.S. PATENT DOCUMENTS

| 2007/0064586 | A1 | 3/2007 | Ma et al. | |
|---|---|---|---|---|
| 2007/0087749 | A1 | 4/2007 | Ionescu et al. | |
| 2008/0026718 | A1 | 1/2008 | Wangard et al. | |
| 2008/0253469 | A1* | 10/2008 | Ma et al. | 375/260 |
| 2008/0267318 | A1* | 10/2008 | Ihm et al. | 375/299 |
| 2009/0067534 | A1* | 3/2009 | Kwak et al. | 375/267 |
| 2010/0085866 | A1* | 4/2010 | Li et al. | 370/208 |

FOREIGN PATENT DOCUMENTS

| JP | 2007-214822 | 8/2007 |
|---|---|---|
| JP | 2007-300507 | 11/2007 |
| JP | 2009-303214 | 12/2009 |

(Continued)

OTHER PUBLICATIONS

European Search Report dated Jul. 24, 2012.

(Continued)

*Primary Examiner* — Mark Rinehart
*Assistant Examiner* — Maharishi Khirodhar
(74) *Attorney, Agent, or Firm* — McClure, Qualey & Rodack, LLP

(57) ABSTRACT

A wireless communication system using pilot allocation, method and pilot pattern thereof are disclosed. The method is applied for allocating pilots for transmission of multiple pilot streams in a multiple-input-multiple-output (MIMO) antenna system using orthogonal frequency division multiplexing (OFDM) modulation. In embodiment, the pilot allocation are applied in contiguous frame structure, and two pilots are allocated for each pilot stream in frame structure comprising 18 subcarriers and 6 OFDM symbols. The 8 pilot streams are grouped into two pilot stream clusters, and pilots for each pilot stream cluster are grouped into two pilot clusters. Four pilot clusters are then allocated in first frame structure, and the allocation of the pilot clusters in second frame structure corresponds to those in first frame structure. Therefore, better transfer rate in such wireless communication system can be achieved.

53 Claims, 16 Drawing Sheets

(56) References Cited

FOREIGN PATENT DOCUMENTS

| | | |
|---|---|---|
| JP | 2010-522499 | 7/2010 |
| JP | 2010-537548 | 12/2010 |
| JP | 2010-539780 | 12/2010 |
| JP | 2011-514742 | 5/2011 |
| JP | 2011-517516 | 6/2011 |
| JP | 2011-523246 | 8/2011 |
| KR | 2008-0063441 | 7/2008 |
| WO | WO 2007/036787 | 4/2007 |
| WO | WO 2007/093379 | 8/2007 |
| WO | WO 2008/044882 | 4/2008 |
| WO | WO 2008/082243 | 7/2008 |
| WO | WO 2009/104895 | 8/2009 |
| WO | WO 2009/124513 | 10/2009 |
| WO | WO 2010/002096 | 1/2010 |

OTHER PUBLICATIONS

Office Action issued in corresponding Malaysian application dated Jun. 4, 2011.
Canadian Office Action dated Jul. 4, 2013.
English language translation of abstract of KR 2008-0063441 (published Jul. 4, 2008.
Japanese language Office Action dated Apr. 1, 2013.
Taiwanese language Notice of Allowance dated Jun. 11, 2013.
Korean language office action dated Mar. 11, 2011.
English language translation of Korean office action.

* cited by examiner (A)        (B)

FIG. 8

WIRELESS COMMUNICATION SYSTEM USING PILOT ALLOCATION, METHOD AND PILOT PATTERN THEREOF

TECHNICAL FIELD

The present invention relates generally to a wireless communication system using pilot allocation, method and pilot pattern thereof, more particularly, related to a method of allocating pilot subcarrier for multiple pilot streams in a multiple-input-multiple-output (MIMO) antenna system using orthogonal frequency division multiplexing (OFDM) modulation.

BACKGROUND

Recent research and development efforts in the field of next generation wireless communication systems aim at providing much higher data rates than existing systems. Generally, reference signals or pilot symbols which are usually in higher data rate wireless communication devices and systems, for performing initial time and frequency synchronization, cell identification, and channel estimation. Channel estimation indicates a process of compensating for distortion of a signal, which occurs by a rapid environment variation due to fading and restoring the transmission signal. For orthogonal frequency division multiplexing (OFDM) system, particularly, a reference signal or pilot symbol referring to a predetermined signal sequence is inserted at a predetermined location in time domain or frequency domain of a data stream, and communication devices is capable of detecting the reference signal or pilot symbol after receiving the data stream, and further performing time and frequency synchronization to measure channel information, and perform interference mitigation or cancellation.

A multiple-input multiple-output (MIMO) antenna technology using multiple transmission antennas and multiple reception antennas is also applied to improve data transmission/reception efficiency. In the MIMO system, a signal experiences a channel corresponding to each antenna. More antennas require more reference signals or pilot symbols, but pilot over-location occupies more channels and reduce amount of channel for transmitting data. Severe pilot overhead occurs, a transfer rate is decreased. Accordingly, it is necessary to arrange the pilots in consideration of multiple antennas.

In prior art, different pilot allocation structures have been designed and used, for example, in IEEE (Institute of Electrical and Electronics Engineering) 802.16e system the pilots are separated from each other in time domain, However, Although several design considerations for pilot structures have been discussed, currently there lacks a systematic approach to design pilot structures or patterns used in a multiple-input-multiple-output (MIMO) antenna system using orthogonal frequency division multiplexing (OFDM) modulation.

SUMMARY OF THE INVENTION

Therefore, an object of the present invention is to provide a method of efficiently allocating pilots for transmission of multiple pilot streams, for better transfer rate and in a multiple-input-multiple-output (MIMO) antenna system using orthogonal frequency division multiplexing (OFDM) modulation.

The object of the present invention can be achieved by providing a method for allocating pilots for transmission of multiple pilot streams in a MIMO antenna system using OFDM modulation, and the method comprises the following step. Two contiguous frame structures are provided, and each frame structure comprising OFDM symbols in time domain and subcarriers in frequency domain. Two pilots are provided for each pilot stream in one frame structure. Then, pilots for the pilot streams are allocated in first frame structure, and the pilots for the pilot streams in second frame structure are allocated based on the pilot allocation in first frame structure.

The object of the present invention can be achieved by providing a method for allocating pilots for transmission of multiple pilot streams in a MIMO antenna system using OFDM modulation, and the method comprises the following steps. First, two contiguous frame structures are provided, and each frame structure comprising OFDM symbols in time domain and subcarriers in frequency domain. The pilot streams are grouped into two pilot stream clusters. Two pilots are provided for each pilot stream in one frame structure, and the pilot subcarriers for each pilot stream cluster forming two pilot clusters. The first pilot cluster for first pilot stream cluster is allocated at first portion of subcarriers on first portion of the OFDM symbols, and second pilot cluster for first pilot stream cluster is allocated at second portion of subcarriers on second portion of the OFDM symbols in first frame structure. First pilot cluster for second pilot stream cluster is allocated at first portion of subcarriers on second portion of the OFDM symbols, and second pilot cluster for second pilot stream cluster is allocated at second portion of subcarriers on first portion of the OFDM symbols in first frame structure. The pilots in second frame structure are arranged based on the pilot allocation in first frame structure. The second pilot cluster for second pilot stream cluster in first frame structure and first pilot cluster for first pilot stream cluster in second frame structure are separated by even number of subcarriers.

BRIEF DESCRIPTION OF THE DRAWINGS

The accompanying drawings, which are included to provide a further understanding of the invention, illustrate embodiments of the invention and together with the description serve to explain the principle of the invention.

FIG. 8 illustrates pilot patterns for 8 pilot streams in subframe with five OFDM symbols and seven OFDM symbols;

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
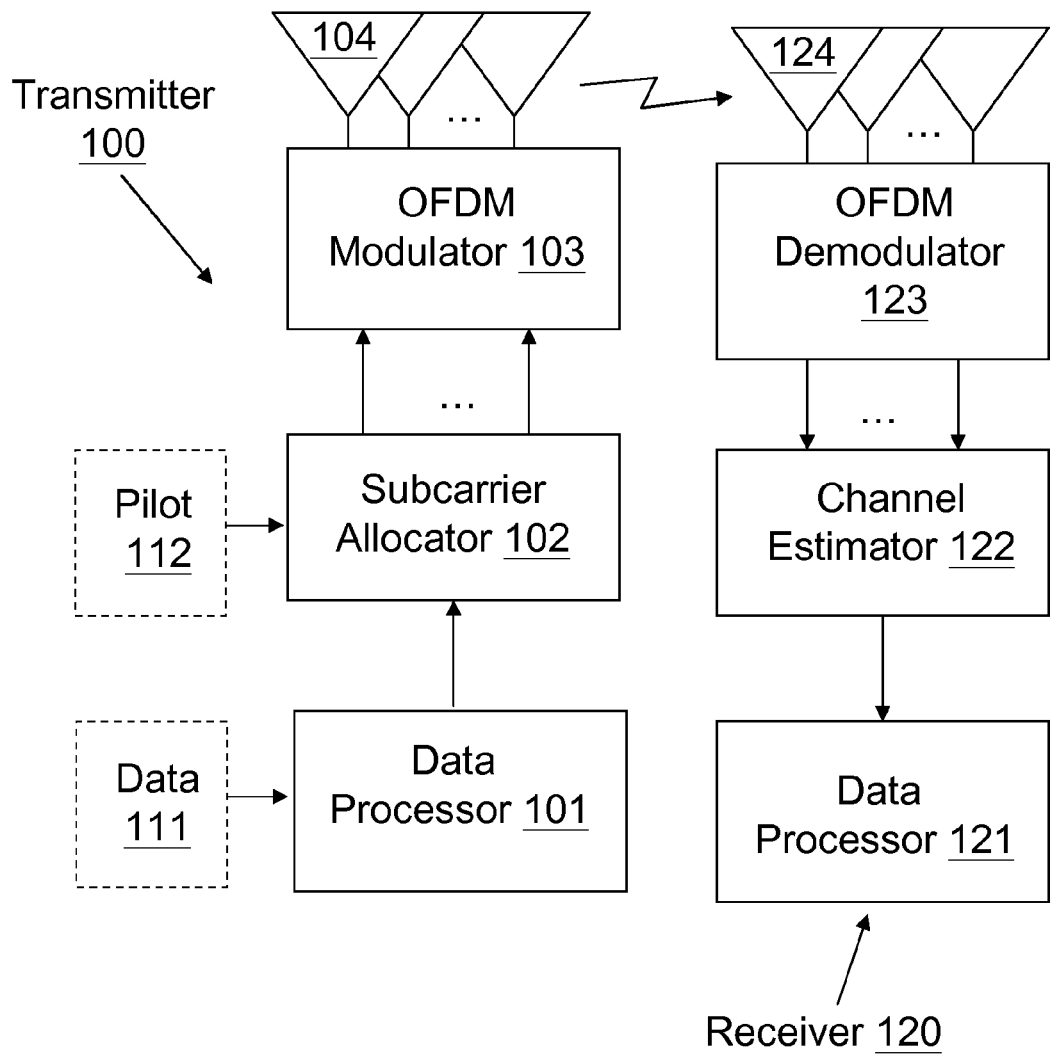
FIG. 1 illustrates a block diagram of an exemplary transmitter and receiver in accordance with the present invention.

FIG. 1 illustrates a block diagram of an exemplary transmitter and receiver in accordance with the present invention. The transmitter 100 comprises a data processor 101, a sub-carrier allocator 102 and an orthogonal frequency division multiplexing (OFDM) modulator 103, and the receiver 120 comprises a data processor 121, a channel estimator 122 and an OFDM demodulator 123. In a wireless communication network using various system, such as code division multiple access (CDMA), wideband code division multiple access (WCDMA), wireless local area network (WLAN), worldwide interoperability for microwave access (WiMAX), and OFDM, may include at least a base station and at least a terminal. The terminal, based on the signal transmission between the transmitter 100 and the receiver 120, receives signals or data from a base station through a downlink (DL) channel establish between terminal and base station, and transmits signals or data to base station through an uplink (UL) channel establish between terminal and base station.

The data processor 101 may include various circuitries provided to process different functions, for example, the data processor 101 is capable of encoding an input data 111 according to a predetermined coding method and generating a coded word, and then mapping the coded word to a symbol representing a position on signal constellation, and processing the input symbol by a MIMO method using a plurality of antennas 104. Preferably, modulation scheme of such mapping performing by the data processor 101 may include an m-phase shift keying (m-PSK) scheme or an m-quadrature amplitude modulation (m-QAM) scheme.

The subcarrier allocator 102 allocates the processed input symbol and pilots 112 to subcarriers. The pilots are arranged according to the transmission antennas 104. The pilots are known by both the transmitter 100 and a receiver 120, which can be used for the channel estimation, time and frequency synchronization, frequency and phase shift error of subcarriers. The pilot is also called reference signal.

The OFDM modulator 103 is capable of modulating the input symbol and outputs OFDM symbols. The OFDM modulator 103 may perform an inverse fast Fourier transform (IFFT) with respect to the input symbol and further insert a cyclic prefix (CP) after performing the IFFT. The OFDM symbols are transmitted via the antennas 104.

The receiver 120 receives the signals via antennas 124 are Fast Fourier transformed (FFT) by the OFDM demodulator 123. The channel estimator 122 estimates channels using received pilots 112. The data processor 121 is capable of demapping the input symbol to the coded word, and then decoding the coded word and restores original data.

Preferably, the data processor 101 and subcarrier allocator 102 may be embodied as separate components, or subcarrier allocator 102 and data processor 101 may be integrated into a processor. Preferably, the channel estimator 122 and data processor 121 may be embodied as separate components, or the channel estimator 122 and the data processor 121 may be integrated into a processor.

The transmitter 100 and receiver 120 may communicate with each other using an OFDM scheme. Further, transmitter 100 and receiver 120 may apply unified pilot patterns or pilot structures to OFDM communications. Unified pilot structures, as used herein, may refer to the same pilot structures used for both common pilots, i.e., all users can use, and dedicated pilots, i.e., limited to a specific user or users. Unified pilot structures may also refer to the same pilot structures used for both DL and UL transmission. Further, unified pilot structures may refer to a series of pilot patterns systematically designed under different operational circumstances, such as different numbers of data stream used, different sizes of resource unit (RU) used, and/or different base station and wireless cell configurations.

Figure 2:
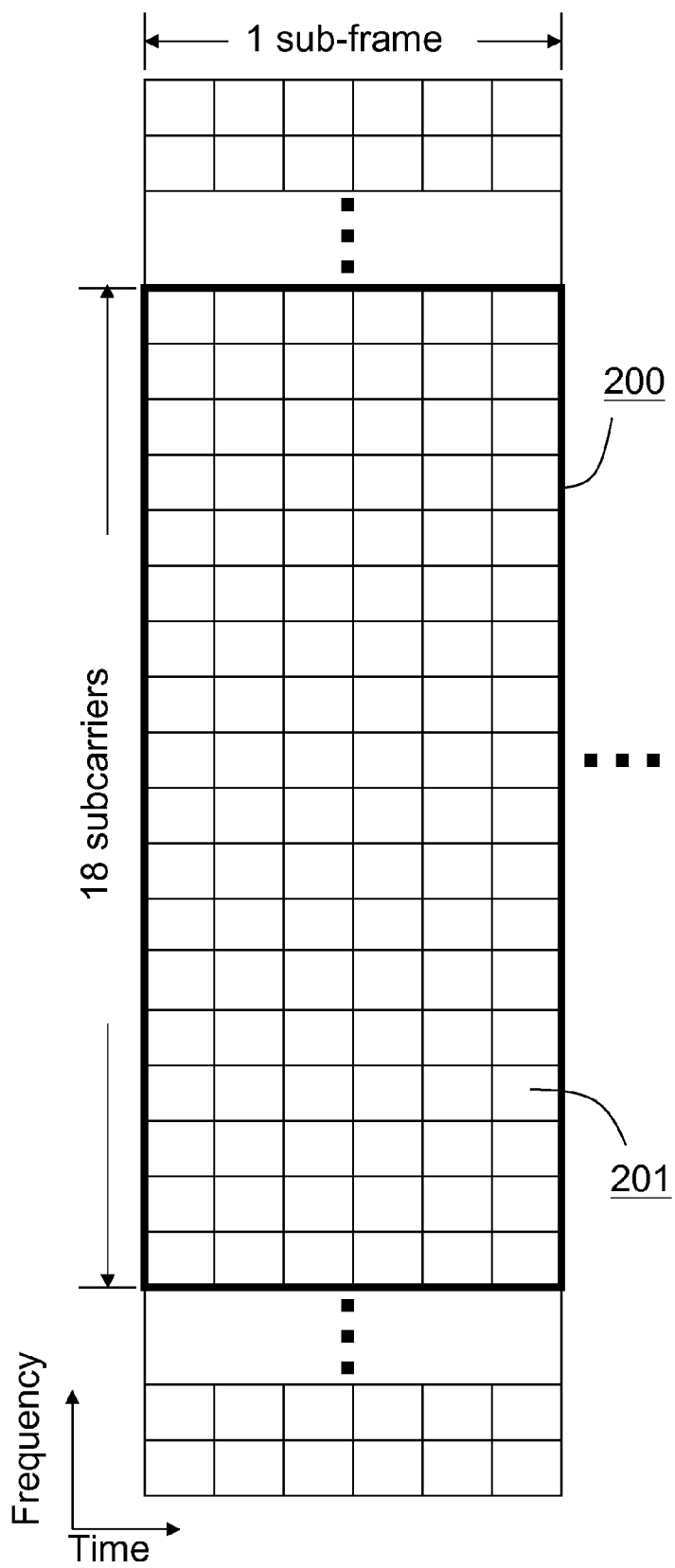
FIG. 2 illustrates an exemplary frame structure in the OFDM scheme.
Figure 8:
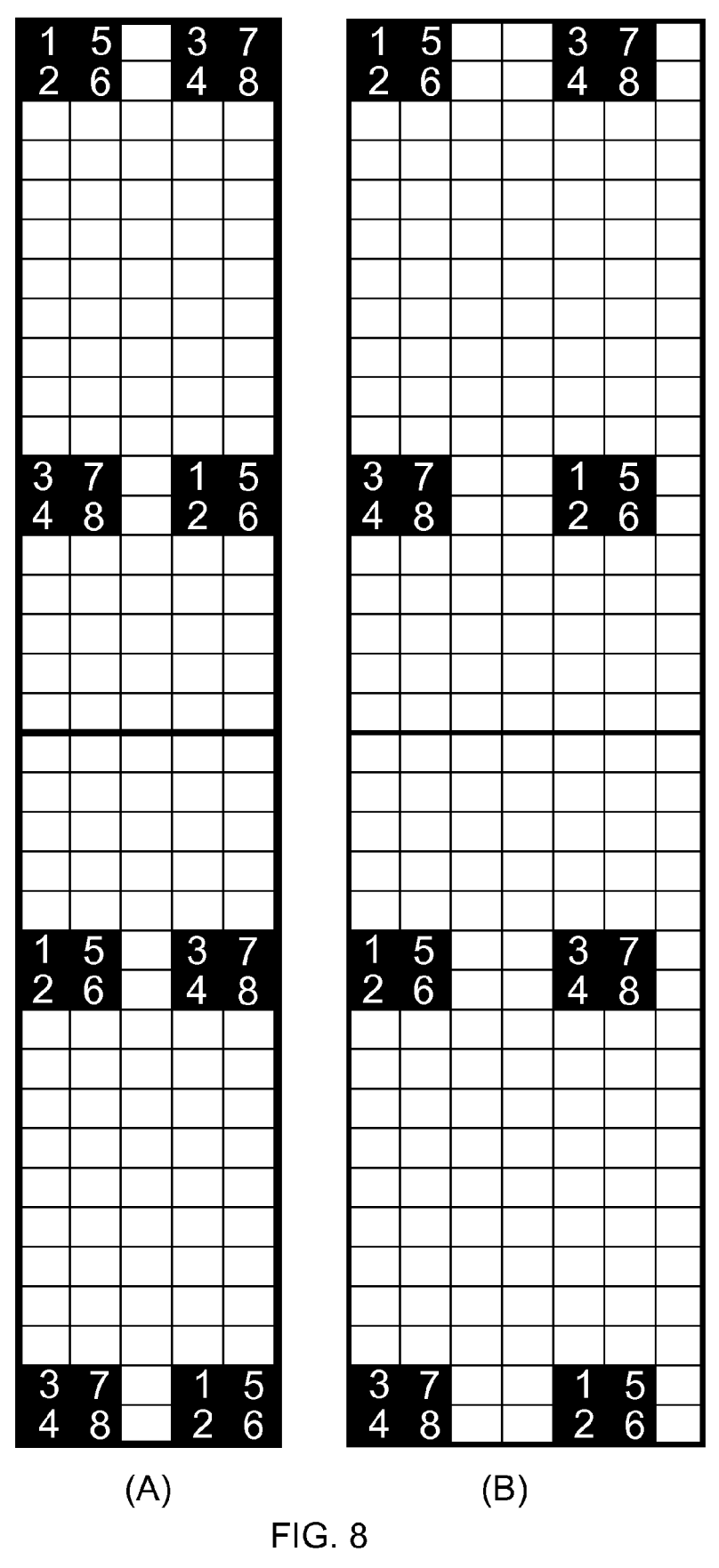

FIG. 2 illustrates an exemplary frame structure in the OFDM scheme. As shown in FIG. 2, OFDM data transmission may be represented in both time and frequency, wherein the vertical axis represents frequency and the horizontal axis represents time. The frame structure 200, which is also called a resource unit (RU), comprises 18 subcarriers (vertical axis)×six OFDM symbols (horizontal axis), wherein the subframe includes six OFDM symbols. The OFDM data may be transmitted by a resource element 201 of frame structure 200 on a sub-carrier (a frequency band) in a time slot (an OFDM symbol). The frame structure 200 may refer to the basic unit for resource allocation that comprises a predetermined number of contiguous sub-carriers by a predetermined number of contiguous OFDMA symbols. The basic resource unit is an 18 sub-carrier and 6 symbol (18×6) data block, however, the method of allocating the pilots according to the present invention is also applicable to other resource units, for example, the resource unit may be an 18 sub-carrier and 5 symbol (18×5) data block, or an 18 sub-carrier and 7 symbol (18×7) data block, as shown in FIG. 8.

Each symbol (a small rectangle in RU 200) may be used for carrying any type of information. For example, a data symbol carries data, and a pilot symbol carries a pilot. However, because adding pilot symbols may reduce the number of data symbols, there may be a desirable tradeoff between adding overhead to provide robust channel estimation using the pilot symbols, while keeping overhead to a minimum so as not to impact spectral efficiency and data rate. The tradeoff may become more complex in MIMO schemes because multiple antennas may be used and multiple data streams or radio/wireless signals may co-exist at a particular time and location.

Basically, the throughput $\eta$ in a communication link is defined as the following formula in wireless communication standard:

$$\eta = \frac{(N_{SC,RU} \times N_{OFDMA,RU} - N_{P,RU}) \times N_{RU,SF} \times R_c \times m \times M}{T_{SF} \times BW} \text{(bps/Hz)} \quad (1\text{-}1)$$

| | |
|---|---|
| $\eta$ | throughput |
| $N_{SC,RU}$ | number of subcarriers in frequency domain included in each RU |
| $N_{OFDMA,RU}$ | number of OFDA symbol in time domain included in each RU |
| $N_{P,RU}$ | number of pilot included in each RU |
| $N_{RU,SF}$ | number of RU in subframe |
| $R_c$ | channel coding rate |
| m | modulation Order |
| M | number of data stream |
| $T_{SF}$ | transmission time of subframe |
| BW | system bandwidth |

In a wireless communication system using 8×8 MIMO antenna system capable of transmitting eight data streams (M=8) simultaneously, when bandwidth provided is 10 MHz (BW=10 MHz), transmission time of subframe provided is $(5\times10^{-3})/8$ second ($T_{SF}=(5\times10^{-3})/8$), modulation Order provided is six (m=6), and channel coding rate provided for each data stream is 237/256 ($R_c$=237/256), 48 RUs are provided in each subframe ($N_{RU,SF}$=48), RU is an 18 sub-carrier and 6 symbol (18×6) data block and 3 pilots are provided in each data stream ($N_{P,RU}$=3×8), the throughput of downlink transmission in such wireless communication system can be calculated as following:

$$\eta = \frac{(N_{SC,RU} \times N_{OFDMA,RU} - N_{P,RU}) \times N_{RU,SF} \times R_c \times m \times M}{T_{SF} \times BW}$$
$$= \frac{(18\times 6 - 3\times 8) \times 48 \times (237/256) \times 6 \times 8}{(5\times 10^{-3}/8) \times (10\times 10^6)}$$
$$= 28.67 \text{(bps/Hz)}$$

If two pilots are provided in each data stream ($N_{P,RU}$=2×8), the throughput of downlink transmission in such wireless communication system is calculated as following:

$$\eta = \frac{(N_{SC,RU} \times N_{OFDMA,RU} - N_{P,RU}) \times N_{RU,SF} \times R_c \times m \times M}{T_{SF} \times BW}$$
$$= \frac{(18\times 6 - 2\times 8) \times 48 \times (237/256) \times 6 \times 8}{(5\times 10^{-3}/8) \times (10\times 10^6)}$$
$$= 31.04 \text{(bps/Hz)}$$

The allocation of 3 pilots per data stream reduces the throughput of downlink transmission to less than 30 bps/Hz required by advance wireless communication standard, such as 4G wireless communication standard. When 2 pilots are used for each data stream in one RU, the throughput of downlink transmission can reach requirement of advance wireless communication standard.

Figure 3:
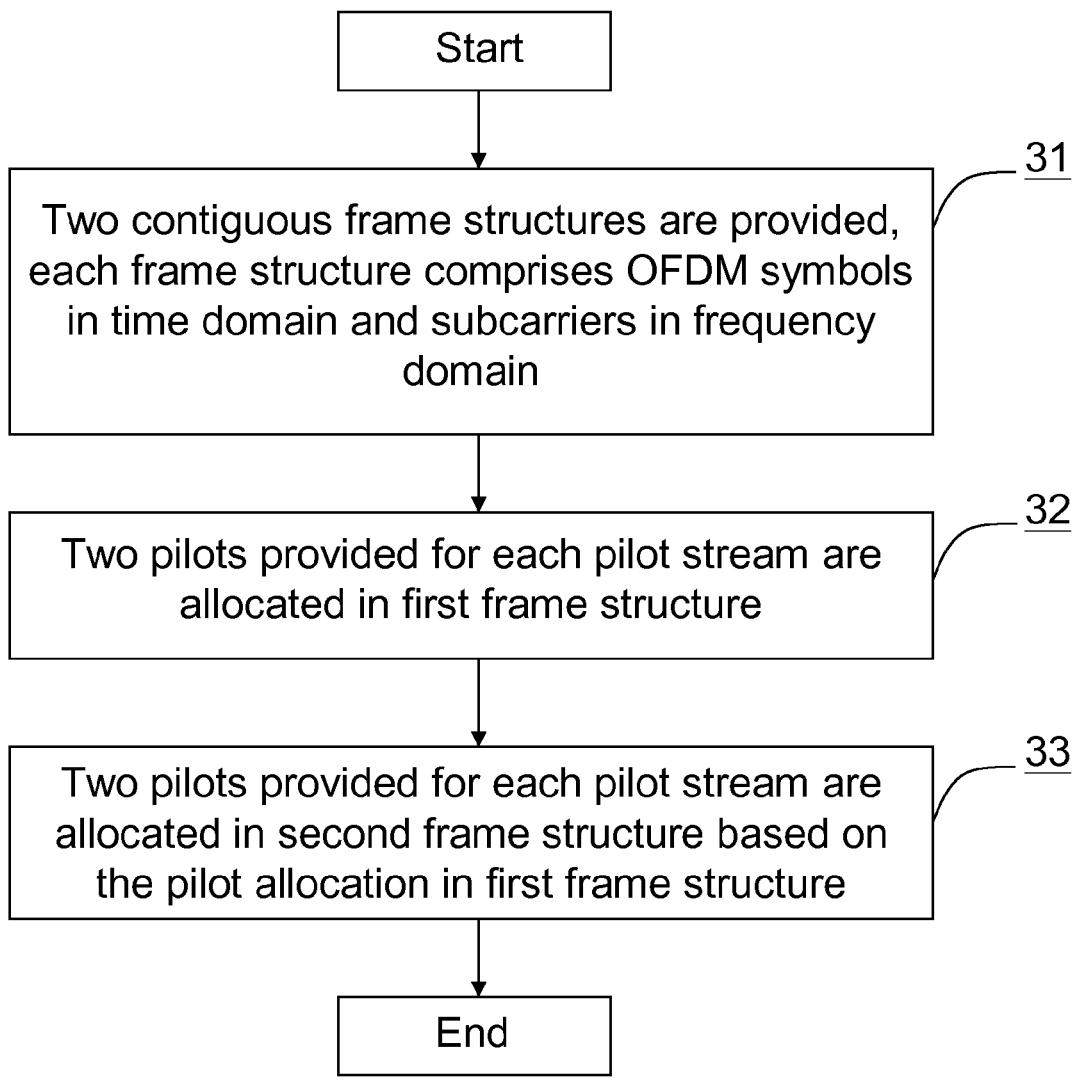
FIG. 3 illustrates a flow chart of method for allocating pilots for transmission of multiple pilot streams in a MIMO antenna system using OFDM modulation in accordance with the present invention.

To reach requirement for high rate throughput and performance of channel estimation, two pilots are used for each data stream in each one of two contiguous frame structures. FIG. 3 illustrates a flow chart of a method for allocating pilots for transmission of multiple pilot streams in a MIMO antenna system using OFDM modulation in accordance with the present invention. The method includes the following steps. In step 31, two contiguous frame structures are provided, and each frame structure comprises OFDM symbols in time domain and subcarriers in frequency domain, as shown in FIG. 2. In step 32, two pilots provided for each pilot stream are allocated in first frame structure. For example, When the MIMO antenna system using OFDM modulation are used to transmitted 8 data streams simultaneously, 16 pilots totally are allocated in one frame structure.

In step 33, two pilots provided for each pilot streams are allocated in second frame structure based on the pilot allocation in first frame structure. For example, the relative locations between pilots in second frame structure can be substantially similar with those of pilots in first frame structure. Preferably, if the pilots are grouped to several pilot clusters for allocation, the relative locations of pilot clusters in second frame structure can be copy or mirror of the relative locations of pilot clusters in first frame structure.

Preferably, such method for allocating pilots can be performed by the subcarrier allocator 102 shown in FIG. 1, or a processor capable of allocating pilots.

Figure 4:
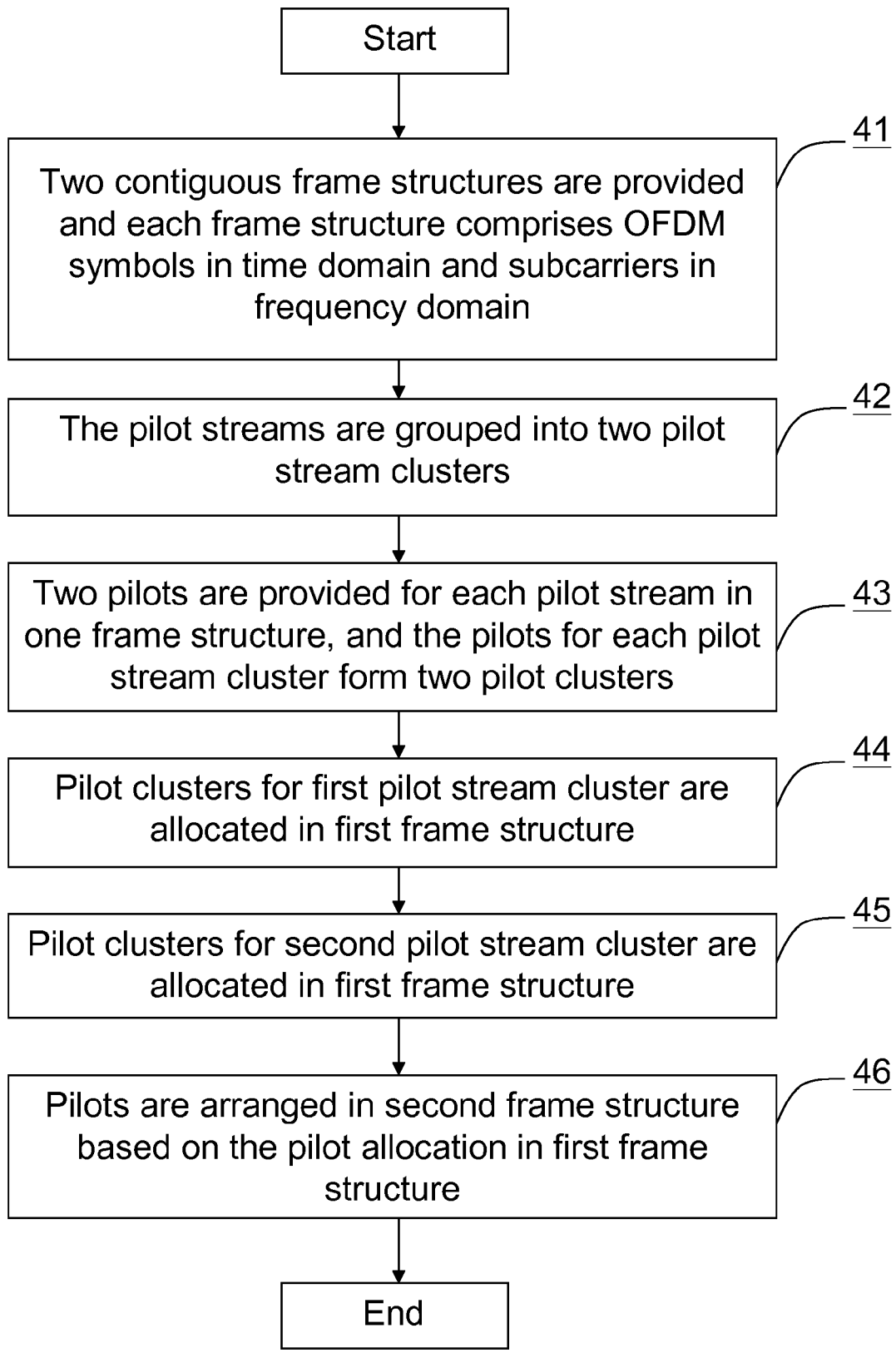
FIG. 4 illustrates the embodiment of flow chart of method for allocating pilots for transmission of multiple pilot streams in a MIMO antenna system using OFDM modulation in accordance with the present invention.
Figure 5:
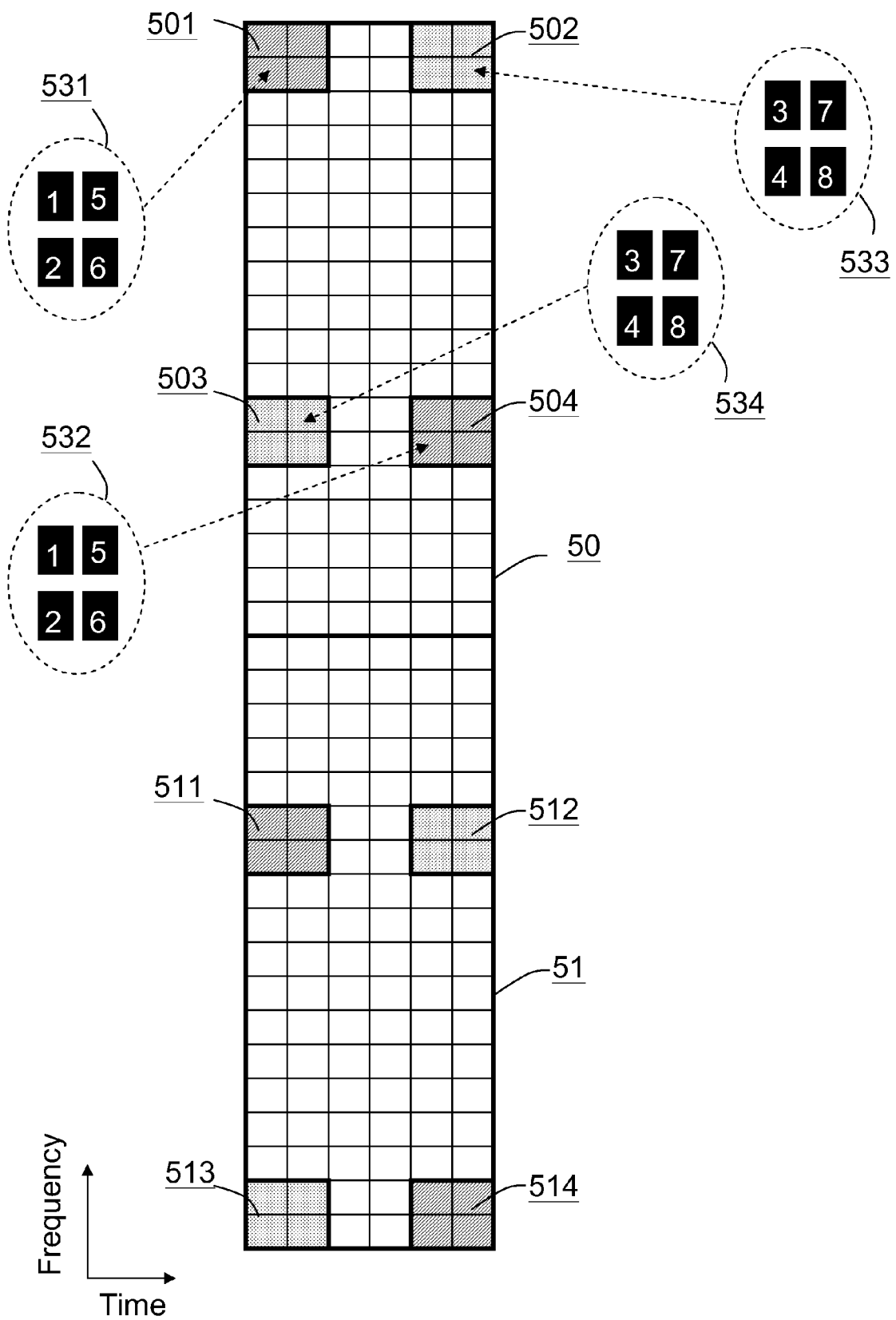
FIG. 5 illustrates an exemplary set of reserved portions for allocating pilots in contiguous frame structures in the OFDM modulation scheme.

FIG. 4 illustrates the flow chart of embodiment of the method for allocating pilots for transmission of multiple pilot streams in a MIMO antenna system using OFDM modulation in accordance with the present invention, and FIG. 5 illustrates an exemplary set of reserved portions for allocating pilots in contiguous frame structures in the OFDM modulation scheme.

In step 41, two contiguous frame structures are provided and each frame structure comprises OFDM symbols in time domain and subcarriers in frequency domain, such as frame structure 50 and frame structure 51 shown in FIG. 5, where the 6 columns represent 6 OFDM symbols and 36 rows represent 36 sub-carriers.

In step 42 the pilot streams are grouped into two pilot stream clusters. For example, pilot stream 1, pilot stream 2, pilot stream 5 and pilot stream 6 are grouped as one pilot stream cluster, and pilot stream 3, pilot stream 4, pilot stream 7 and pilot stream 8 are grouped as other pilot stream cluster.

In step 43 two pilots are provided for each pilot stream in one frame structure, and the pilots for each pilot stream cluster form two pilot clusters. For example, pilots for pilot stream 1, pilot stream 2, pilot stream 5 and pilot stream 6 form pilot cluster 531 and pilot cluster 532, and pilots for pilot stream 3, pilot stream 4, pilot stream 7 and pilot stream 8 form pilot cluster 533 and pilot cluster 534, as shown in FIG. 5, where '1' represents pilot symbol for pilot stream 1; '2' represents pilot symbol for pilot stream 2; '3' represents pilot symbol for pilot stream 3; '4' represents pilot symbol for pilot stream 4; '5' represents pilot symbol for pilot stream 5; '6' represents pilot symbol for pilot stream 6; '7' represents pilot symbol for pilot stream 7; '8' represents pilot symbol for pilot stream 8.

In step 44 first pilot cluster for first pilot stream cluster are allocated at first portion of subcarriers on first portion of the OFDM symbols, and second pilot cluster for first pilot stream cluster at second portion of subcarriers on second portion of the OFDM symbols in first frame structure. For example, pilot cluster 531 can be allocated in portion 501 formed by four resource elements, and pilot cluster 532 can be allocated in portion 504 formed by four resource elements.

In step 45 first pilot cluster for second pilot stream cluster are allocated at first portion of subcarriers on second portion of the OFDM symbols, and second pilot cluster for second pilot stream cluster are allocated at second portion of subcarriers on first portion of the OFDM symbols in first frame structure. For example, pilot cluster 531 can be allocated in portion 501, and pilot cluster 532 can be allocated in portion 504, pilot cluster 533 can be allocated in portion 502, and pilot cluster 534 can be allocated in portion 503.

In step 46, pilots are arranged in second frame structure based on the pilot allocation in first frame structure. Preferably, the relative locations of pilot clusters in second frame structure can be copy of the relative locations of pilot clusters in first frame structure. For example, when pilot clusters for first pilot stream cluster in frame structure 50 are allocated in portion 501 and 504, the relative locations of pilot clusters in frame structure 51 can be copy of the relative locations of pilot clusters in frame structure 50, it means that pilot clusters for first pilot stream cluster in frame structure 51 can be allocated in portion 511 and 514, as shown in FIG. 5, and the pilot clusters for second pilot stream cluster in frame structure 51 can be allocated in portion 512 and 513.

Preferably, such embodiment of method for allocating pilots can be performed by the subcarrier allocator 102 shown in FIG. 1, or a processor capable of allocating pilots.

Figure 6:
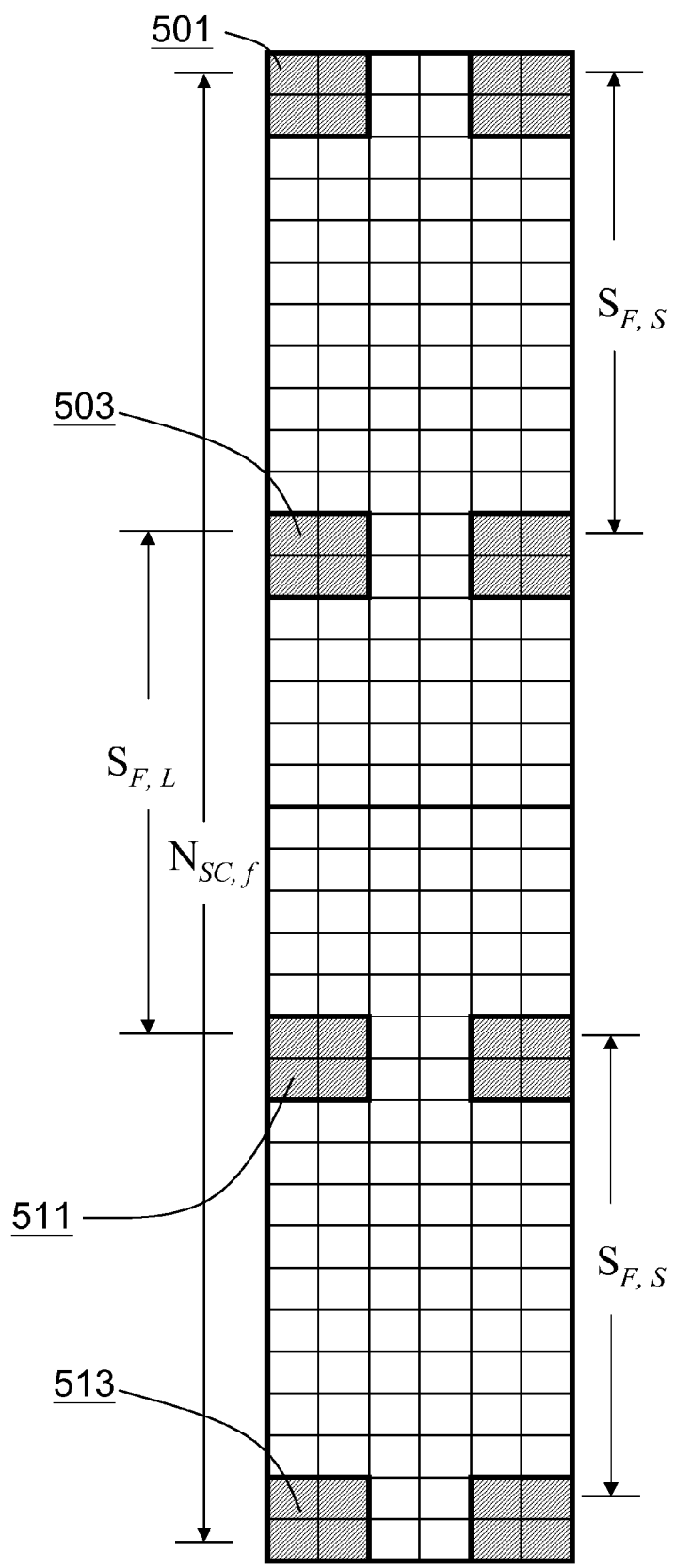
FIG. 6 illustrates a schematic view of determination of location of reserved portions for allocating pilots in contiguous frame structures in the OFDM modulation scheme.

FIG. 6 illustrates a schematic view of determination of location of reserved portions for allocating pilots in contiguous frame structures in the OFDM modulation scheme. It is noted that the distances between pilot clusters shown in FIG. 5 can be determined according to the following formulas:

$$S_{F,S} = \left\lfloor \frac{N_{SC,f}}{N_{P,f} - 1} \right\rfloor \quad (1\text{-}2)$$

$$N_{S_{F,S}} = N_{P,f} - (N_{SC,f} \bmod (N_{P,f} - 1)) \quad (1\text{-}3)$$

$$S_{F,L} = \left\lfloor \frac{N_{SC,f}}{N_{P,f} - 1} \right\rfloor + 1 = S_{F,S} + 1 \quad (1\text{-}4)$$

$$N_{S_{F,L}} = (N_{SC,f} \bmod (N_{P,f} - 1)) - 1 = N_{P,f} - N_{S_{F,S}} - 1 \quad (1\text{-}5)$$

| | |
|---|---|
| $N_{P,f}$ | number of pilots over contiguous resource units in frequency direction |
| $S_{F,S}$ | short pilot spacing in subcarriers in frequency direction |
| $S_{F,L}$ | long pilot spacing in subcarriers in frequency direction |
| $N_{SC,f}$ | pilot spacing in subcarriers between first and last pilots in frequency direction |
| $NS_{F,S}$ | number of units of short pilot spacing |
| $NS_{F,L}$ | number of units of long pilot spacing |

For example, the number of subcarrier of two contiguous frame structures is 36, so $N_{SC,f}$ may be defined as 35. Because two pilots are provided for each pilot stream in one frame structure, $N_{P,f}$ is defined as 4. According to formula (1-2), $S_{F,S}$ can be determined as 11

$$\left( s_{F,S} = \left\lfloor \frac{35}{4-1} \right\rfloor = 11 \right).$$

The number of units of short pilot spacing $NS_{F,S}$ is then determined as 2 ($NS_{F,S}$=4−(35 mod 3)=2), and $S_{F,L}$ is then determined as 12 ($S_{F,L}$=11+11=12), $NS_{F,L}$ is determined as 1 ($NS_{F,L}$=(35 mode 3)−1=1).

When the number of desired pilot stream exceeds 4, such as 5 to 8, the reserved the pilots comprises four resource elements in a rectangular layout, such as portion 501 and portion 503, portion 503 and portion 511, portion 511 and portion 513 shown in FIG. 6. The pilots allocated in one frame structure are grouped into four pilot clusters and allocated in the reserved portions respectively. According to the above-mentioned formulas and predefined parameters, the spaces between portion 501 and portion 503, portion 503 and portion 511, portion 511 and portion 513 for pilot clusters in frequency domain with the subcarrier index increasing from top to bottom are 9 (11−2=9), 10 (12−2=9) and 9 (11−2=9) resource elements.

Figure 7:
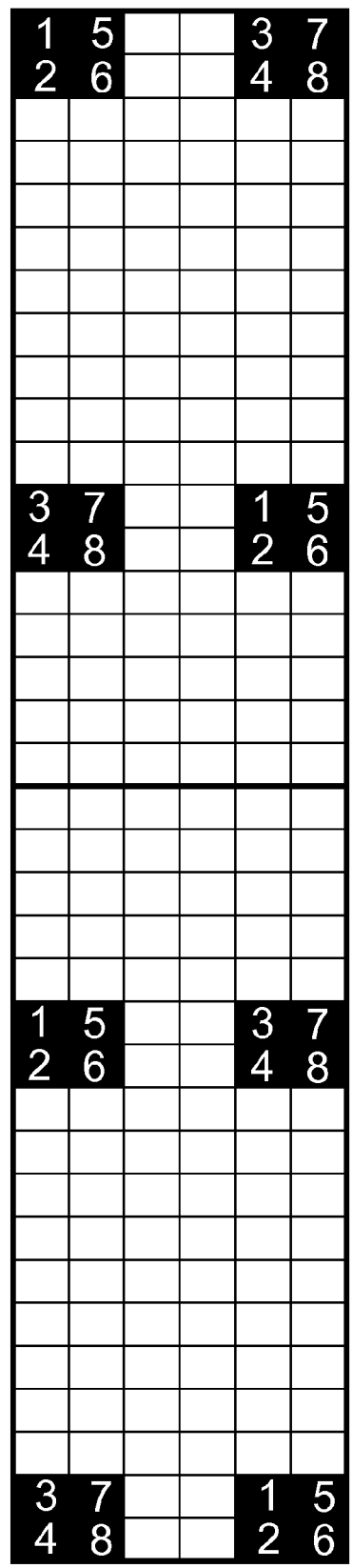
FIG. 7 illustrates a pilot pattern for 8 pilot streams in subframe with six OFDM symbols.

FIG. 7 and FIG. 8 illustrate embodiments of pilot pattern for 8 pilot streams in accordance with the present invention. FIG. 7 illustrates pilot pattern for 8 pilot streams in subframe with six OFDM symbols, where the RU is in size of 18×6, the 6 columns represent 6 OFDM symbols and 18 rows represent 18 sub-carriers, and '1' represents pilot symbol for pilot stream 1; '2' represents pilot symbol for pilot stream 2; '3' represents pilot symbol for pilot stream 3; '4' represents pilot symbol for pilot stream 4; '5' represents pilot symbol for stream 5; '6' represents pilot symbol for stream 6; '7' represents pilot symbol for stream 7; '8' represents pilot symbol for stream 8, and '0' represents non-pilot symbol such as data symbols.

Similarly, the pilot pattern (A) and pilot pattern (B) shown in FIG. 8 are respectively for 8 pilot streams in subframe with five OFDM symbols and seven OFDM symbols.

Figure 9:
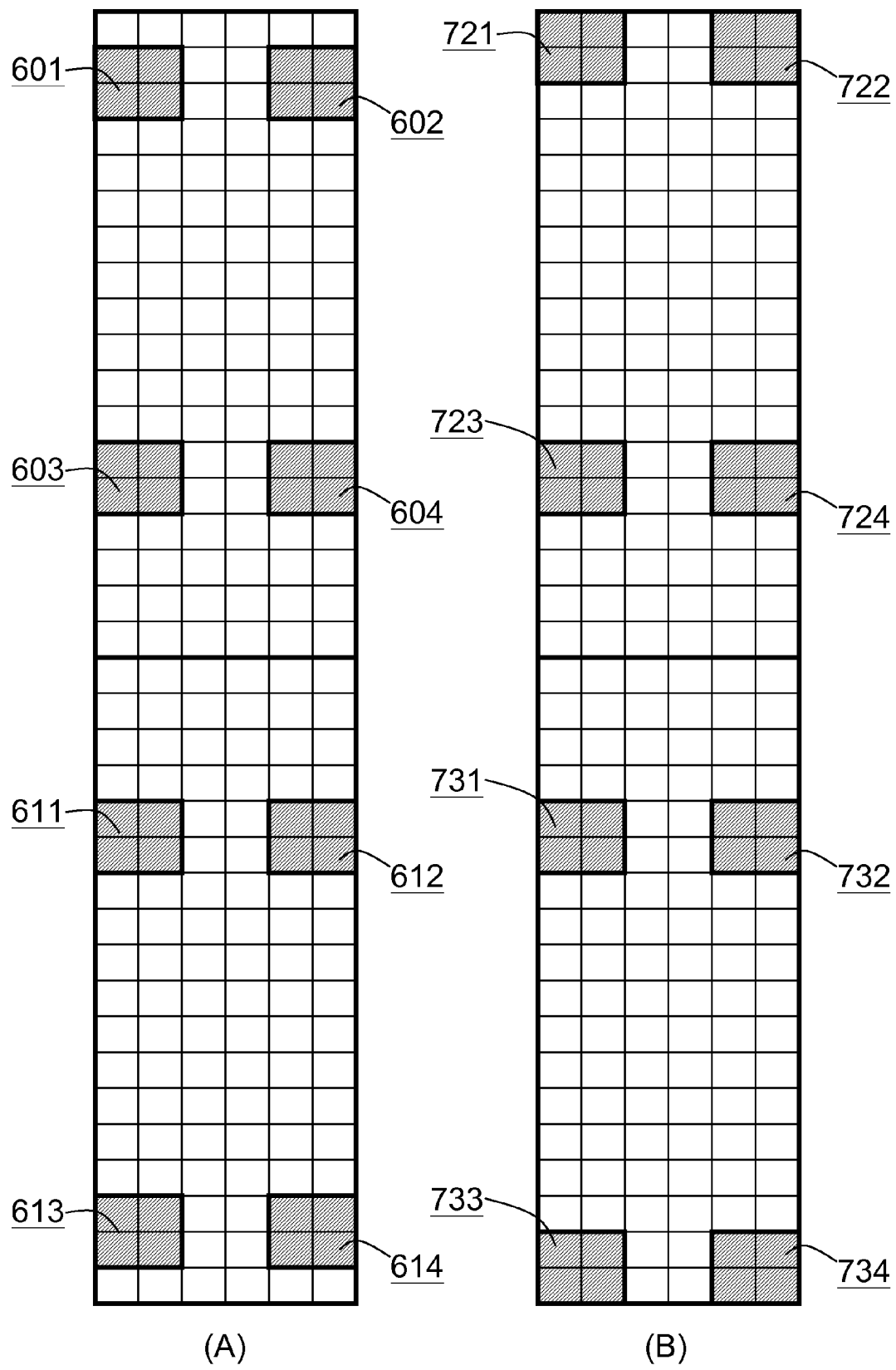
FIG. 9 illustrates other exemplary sets of reserved portions for allocating pilots in contiguous frame structures in the OFDM modulation scheme.

FIG. 9 illustrates other exemplary sets of reserved portions for allocating pilots in contiguous frame structures in the OFDM modulation scheme. Based on the set of reserved portions shown in FIG. 6, the locations of the reserved portions can be modified upon demand. In FIG. 9, the portions comprising the resource element drawn with slash line are reserved for allocating pilots, such as portion 601~604 and 611~614 in exemplary set (A), and portions 721~724 and portion 731~734 in exemplary set (B). Preferably, communication system using a 5-stream configuration, 6-stream configuration, 7-stream configuration or 8-stream configuration can allocate the pilots according to these exemplary sets of reserved portions for allocating pilots.

Figure 10:
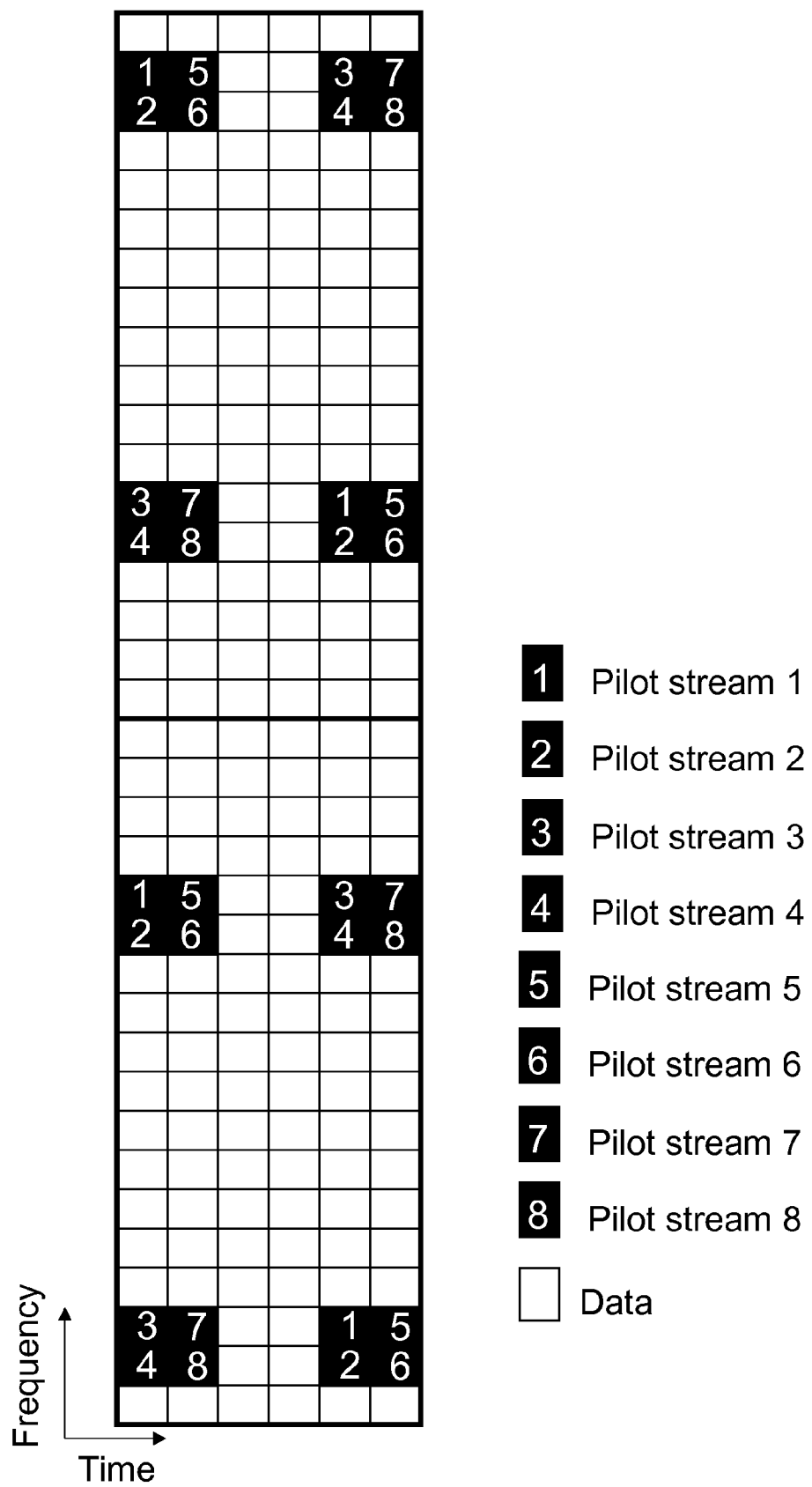
FIG. 10 illustrates another pilot pattern for 8 pilot streams in subframe with six OFDM symbols.

FIG. 10 illustrates another pilot pattern for 8 pilot streams in subframe with six OFDM symbols. This pilot pattern corresponds to exemplary set (A) shown in FIG. 9. The pilot pattern is shown with the subcarrier index increasing from top to bottom and the OFDM symbol index increasing from left to right. The pilots for 1st pilot stream are arranged respectively at 2nd subcarrier and 23th subcarrier on 1st symbol, and at 13th subcarrier and 34th subcarrier on 5th symbol. The pilots for 2nd pilot stream are arranged respectively at 3rd subcarrier and 24th subcarrier on 1st symbol, and at 14th subcarrier and 35th subcarrier on 5th symbol. The pilots for 3rd pilot stream are arranged respectively at 13th subcarrier and 34th subcarrier on 1st symbol, at 2nd subcarrier and 23th subcarrier on 5th symbol. The pilots for 4th pilot stream are arranged respectively at 14th subcarrier and 35th subcarrier on 1st symbol, at 3rd subcarrier and 24th subcarrier on 5th symbol. The pilots for 5th pilot stream are arranged respectively at 2nd subcarrier and 23th subcarrier on 2nd symbol, at 13th subcarrier and 34th subcarrier on 6th symbol. The pilots for 6th pilot stream are arranged respectively at 3rd subcarrier and 24th subcarrier on 2nd symbol, at 14th subcarrier and 35th subcarrier on 6th symbol. The pilots for 7th pilot stream are arranged respectively at 13th subcarrier and 34th subcarrier on 2nd symbol, at 2nd subcarrier and 23th subcarrier on 6th symbol. The pilots for 8th pilot stream arranged respectively at 14th subcarrier and 35th subcarrier on 2nd symbol, at 3rd subcarrier and 24th subcarrier on 6th symbol.

Figure 11:
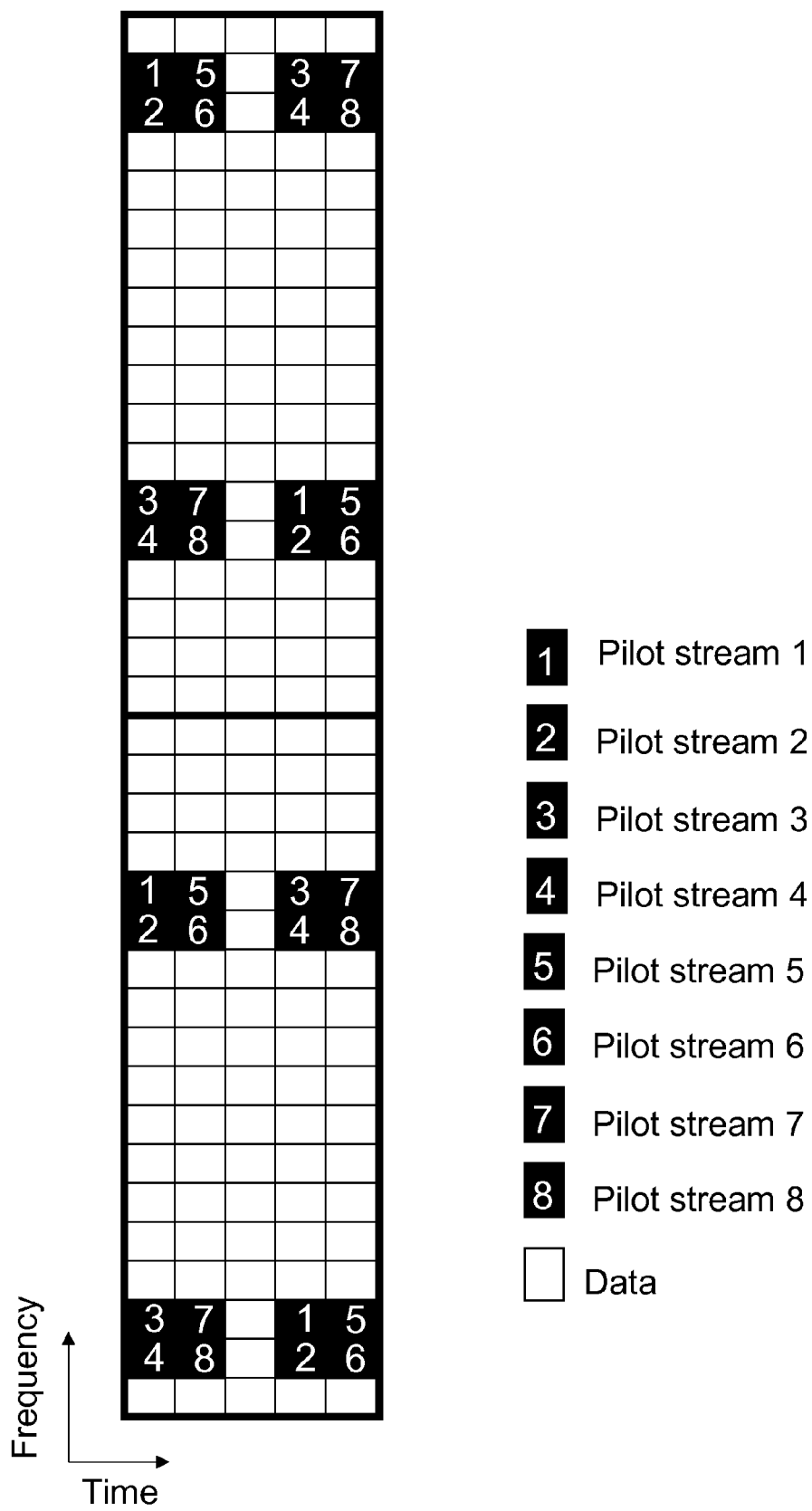
FIG. 11 illustrates another pilot pattern for 8 pilot streams in subframe with five OFDM symbols.

FIG. 11 illustrates another pilot pattern for 8 pilot streams in subframe with five OFDM symbols. The pilot pattern is shown with the subcarrier index increasing from top to bottom and the OFDM symbol index increasing from left to right. The pilots for 1st pilot stream are arranged respectively at 2nd subcarrier and 23th subcarrier on 1st symbol, at 13th subcarrier and 34th subcarrier on 4th symbol. The pilots for 2nd pilot stream are arranged respectively at 3rd subcarrier and 24th subcarrier on 1st symbol, at 14th subcarrier and 35th subcarrier on 4th symbol. The pilots for 3rd pilot stream are arranged respectively at 13th subcarrier and 34th subcarrier on 1st symbol, at 2nd subcarrier and 23th subcarrier on 4th symbol. The pilots for 4th pilot stream are arranged respectively at 14th subcarrier and 35th subcarrier on 1st symbol, at 3rd subcarrier and 24th subcarrier on 4th symbol. The pilots for 5th pilot stream are arranged respectively at 2nd subcarrier and 23th subcarrier on 2nd symbol, at 13th subcarrier and 34th subcarrier on 5th symbol. The pilots for 6th pilot stream are arranged respectively at 3rd subcarrier and 24th subcarrier on 2nd symbol, at 14th subcarrier and 35th subcarrier on 5th symbol. The pilots for 7th pilot stream are arranged respectively at 13th subcarrier and 34th subcarrier on 2nd symbol, at 2nd subcarrier and 23th subcarrier on 5th symbol. The pilots for 8th pilot stream are arranged respectively at 14th subcarrier and 35th subcarrier on 2nd symbol, at 3rd subcarrier and 24th subcarrier on 5th symbol.

Figure 12:
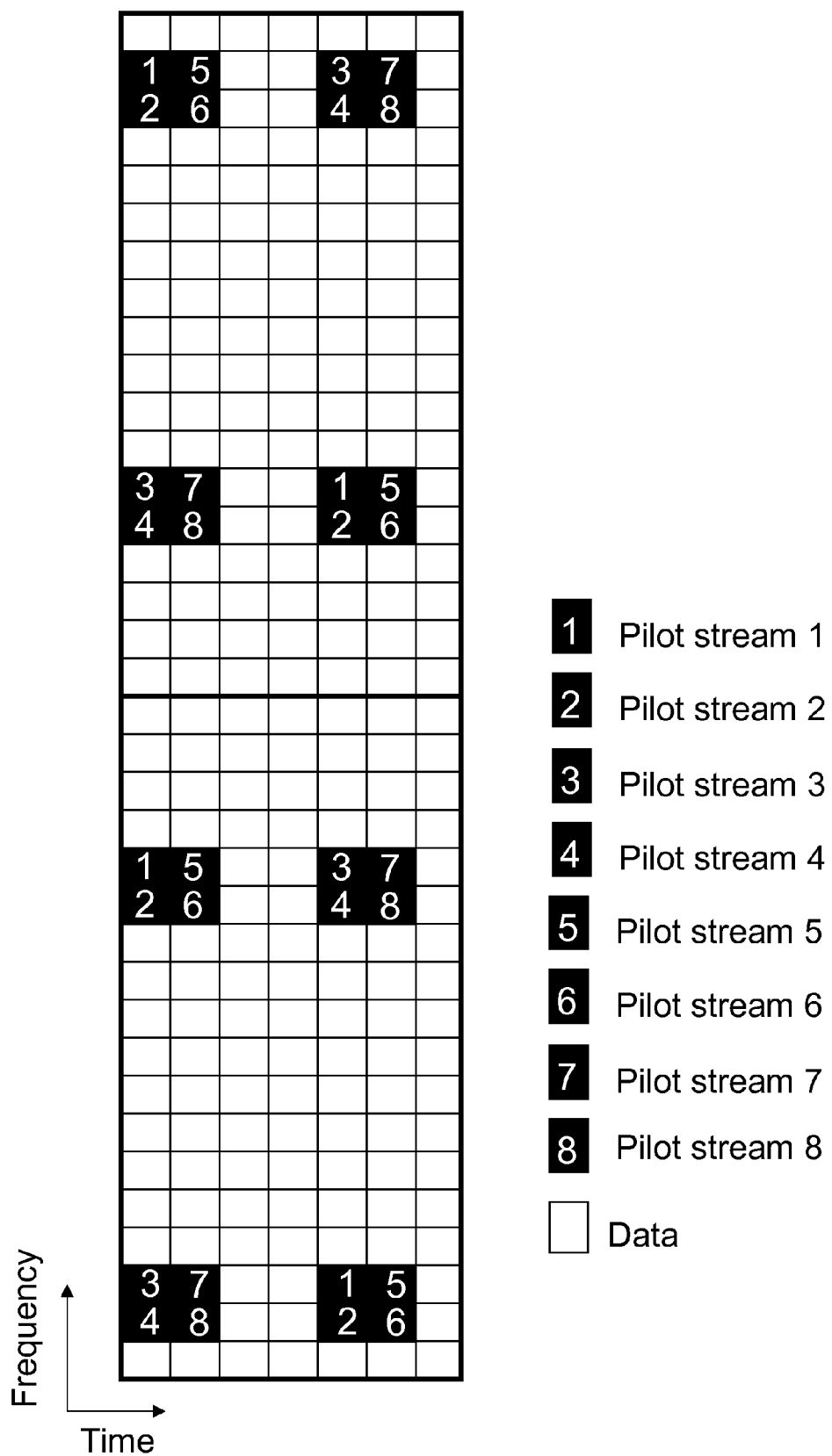
FIG. 12 illustrates another pilot pattern for 8 pilot streams in subframe with seven OFDM symbols.

FIG. 12 illustrates another pilot pattern for 8 pilot streams in subframe with seven OFDM symbols. The pilot patterns are shown with the subcarrier index increasing from top to bottom and the OFDM symbol index increasing from left to right. The pilots for 1st pilot stream are arranged respectively at 2nd subcarrier and 23th subcarrier on 1st symbol, at 13th subcarrier and 34th subcarrier on 5th symbol. The pilots for 2nd pilot stream are arranged respectively at 3rd subcarrier and 24th subcarrier on 1st symbol, at 14th subcarrier and 35th subcarrier on 5th symbol. The pilots for 3rd pilot stream are arranged respectively at 13th subcarrier and 34th subcarrier on 1st symbol, at 2nd subcarrier and 23th subcarrier on 5th symbol. The pilots for 4th pilot stream are arranged respectively at 14th subcarrier and 35th subcarrier on 1st symbol, at 3rd subcarrier and 24th subcarrier on 5th symbol. The pilots for 5th pilot stream are arranged respectively at 2nd subcarrier and 23th subcarrier on 2nd symbol, at 13th subcarrier and 34th subcarrier on 6th symbol. The pilots for 6th pilot stream are arranged respectively at 3rd subcarrier and 24th subcarrier on 2nd symbol, at 14th subcarrier and 35th subcarrier on 6th symbol. The pilots for 7th pilot stream are arranged respectively at 13th subcarrier and 34th subcarrier on 2nd symbol, at 2nd subcarrier and 23th subcarrier on 6th symbol. The pilots for 8th pilot stream are arranged respectively at 14th subcarrier and 35th subcarrier on 2nd symbol, at 3rd subcarrier and 24th subcarrier on 6th symbol.

Figure 13:
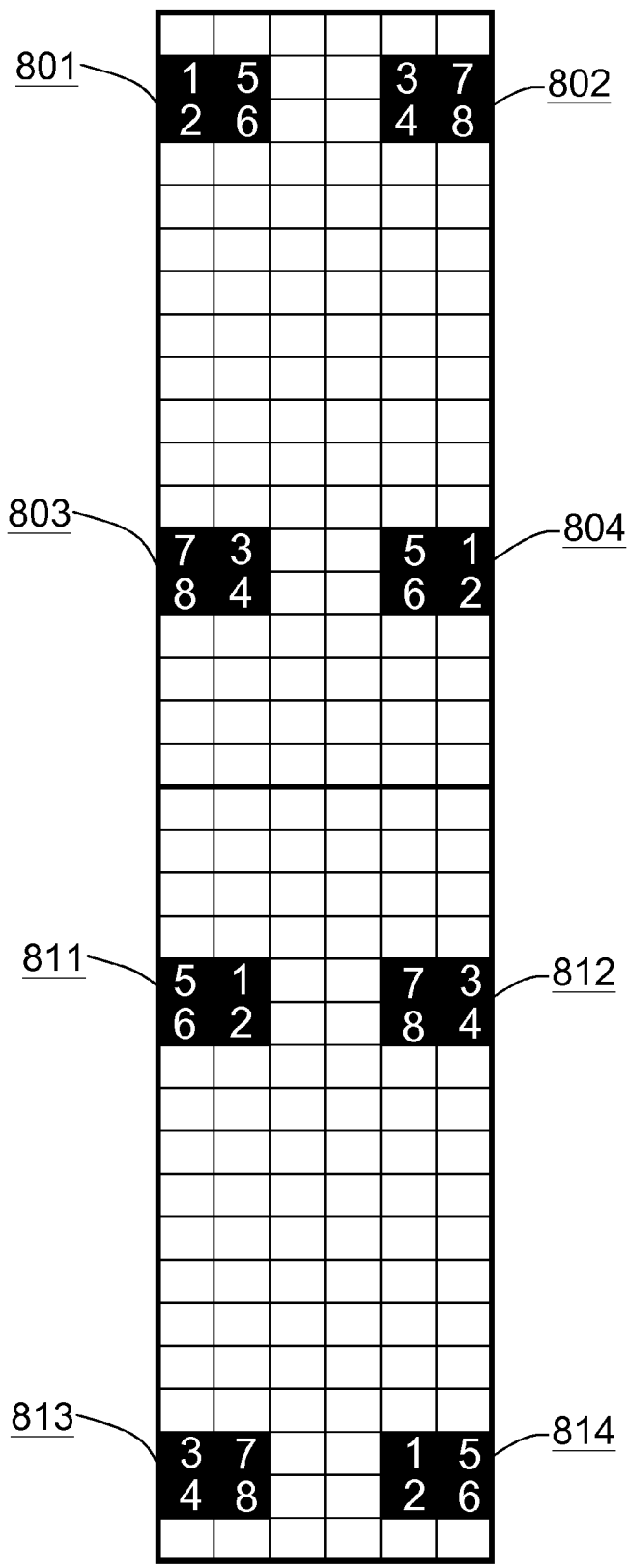
FIG. 13 illustrates another pilot pattern for 8 pilot streams in subframe with six OFDM symbols.

FIG. 13 illustrates another pilot pattern for 8 pilot streams in subframe with six OFDM symbols. According to the method for allocating pilots for transmission of multiple pilot streams in a MIMO antenna system using OFDM modulation in accordance with the present invention, the pilot streams are grouped into two pilot stream clusters (step 42 shown in FIG. 4) and pilots for each pilot stream cluster are then allocated to the reserved portion. In embodiment, the pilots of pilot cluster for first pilot stream cluster can be re-permutated upon demand.

In FIG. 13, the pilots of pilot cluster 801, 804, 811 and 814 are pilots for pilot stream 1, pilot stream 2, pilot stream 5 and pilot stream 6, and the pilots of pilot cluster 802, 803, 812 and 813 are pilots for pilot stream 3, pilot stream 4, pilot stream 7 and pilot stream 8. Compared pilot pattern shown in FIG. 13 with pilot pattern shown in FIG. 10, the pilots of pilot cluster 804 and 811 are re-permutated from pilot cluster 801, and the pilots of pilot cluster 803 and 812 are re-permutated from pilot cluster 802. Preferably, such re-permutation manner is also applicable to other pilot pattern, such as pilot patterns shown in FIG. 7, FIG. 8, FIG. 10, er-FIG. 11 or FIG. 12.

Figure 14:
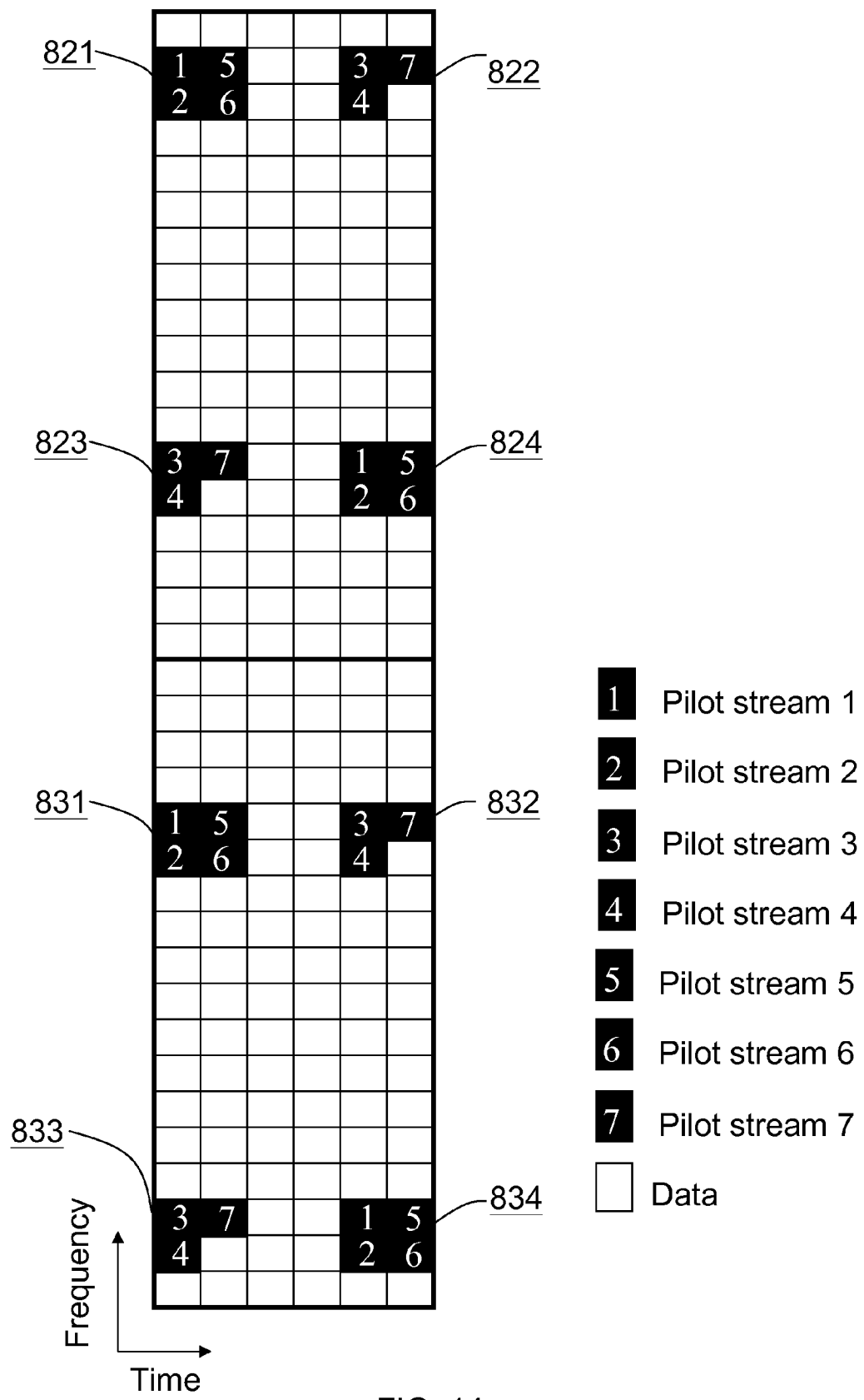
FIG. 14 illustrates a pilot pattern for 7 pilot streams in subframe with six OFDM symbols.

FIG. 14 illustrates a pilot pattern for 7 pilot streams in subframe with six OFDM symbols, and the pilots are allocated in reserved portions of exemplary set (A) shown in FIG. 9. In FIG. 14, pilots for pilot stream 1, pilot stream 2, pilot stream 5 and pilot stream 6 are grouped into pilot cluster 821, 824, 831 and 834 respectively. Pilots for pilot stream 3, pilot stream 4 and pilot stream 7 are grouped into pilot cluster 822, 823, 832 and 833 respectively. Pilot cluster 821, 824, 831 and 834 are respectively allocated in portion 601, portion 604, portion 611 and portion 614 of exemplary set (A) shown in FIG. 9, and pilot cluster 822, 823, 832 and 833 are respectively allocated in portion 602, portion 603, portion 612 and portion 613 of exemplary set (A) shown in FIG. 9.

The pilot pattern is shown with the subcarrier index increasing from top to bottom and the OFDM symbol index increasing from left to right. The pilots for 1st pilot stream are arranged respectively at 2nd subcarrier and 23th subcarrier on 1st symbol, at 13th subcarrier and 34th subcarrier on 5th symbol. The pilots for 2nd pilot stream are arranged respectively at 3rd subcarrier and 24th subcarrier on 1st symbol, at 14th subcarrier and 35th subcarrier on 5th symbol. The pilots for 3rd pilot stream are arranged respectively at 13th subcarrier and 34th subcarrier on 1st symbol, at 2nd subcarrier and 23th subcarrier on 5th symbol. The pilots for 4th pilot stream are arranged respectively at 14th subcarrier and 35th subcarrier on 1st symbol, at 3rd subcarrier and 24th subcarrier on 5th symbol. The pilots for 5th pilot stream are arranged respectively at 2nd subcarrier and 23th subcarrier on 2nd symbol, at 13th subcarrier and 34th subcarrier on 6th symbol. The pilots for 6th pilot stream are arranged respectively at 3rd subcarrier and 24th subcarrier on 2nd symbol, at 14th subcarrier and 35th subcarrier on 6th symbol. The pilots for 7th pilot stream are arranged respectively at 13th subcarrier and 34th subcarrier on 2nd symbol, at 2nd subcarrier and 23th subcarrier on 6th symbol.

Preferably, such pilot clusters can also allocated in reserved portion of the exemplary set shown in FIG. 6 or the exemplary set (B) shown in FIG. 9. Preferably, such pilot pattern for 7 pilot streams can also be applicable in subframe with five OFDM symbols or seven OFDM symbols, such as the pilot pattern shown in FIG. 8 or FIG. 11 or FIG. 12. Preferably, permutation of some pilot clusters can also be implemented upon demand.

Figure 15:
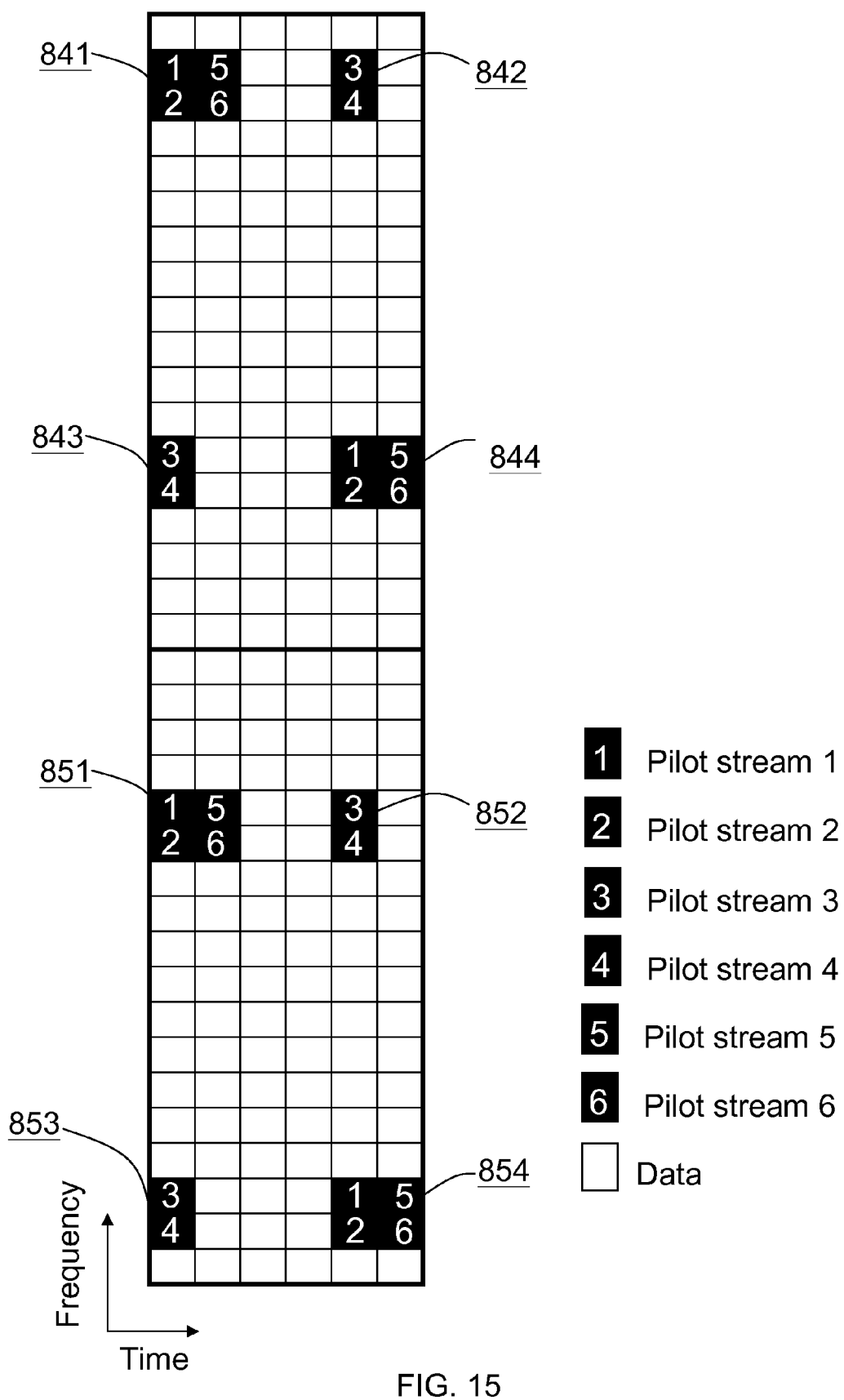
FIG. 15 illustrates a pilot pattern for 6 pilot streams in subframe with six OFDM symbols.

FIG. 15 illustrates pilot pattern for transmission of 6 pilot streams in subframe with six OFDM symbols, and the pilots are allocated in reserved portions of exemplary set (A) shown in FIG. 9. In FIG. 15, pilots for pilot stream 1, pilot stream 2, pilot stream 5 and pilot stream 6 are grouped into pilot cluster 841, 844, 851 and 854 respectively, and pilots for pilot stream 3 and pilot stream 4 are grouped into pilot cluster 842, 843, 852 and 853 respectively. Pilot cluster 841, 844, 851 and 854 are respectively allocated in portion 601, portion 604, portion 611 and portion 614 of exemplary set (A) shown in FIG. 9, and pilot cluster 842, 843, 852 and 853 are respectively allocated in portion 602, portion 603, portion 612 and portion 613 of exemplary set (A) shown in FIG. 9.

The pilot pattern is shown with the subcarrier index increasing from top to bottom and the OFDM symbol index increasing from left to right. The pilots for 1st pilot stream are arranged respectively at 2nd subcarrier and 23th subcarrier on 1st symbol, at 13th subcarrier and 34th subcarrier on 5th symbol. The pilots for 2nd pilot stream are arranged respectively at 3rd subcarrier and 24th subcarrier on 1st symbol, at 14th subcarrier and 35th subcarrier on 5th symbol. The pilots for 3rd pilot stream are arranged respectively at 13th subcarrier and 34th subcarrier on 1st symbol, at 2nd subcarrier and 23th subcarrier on 5th symbol. The pilots for 4th pilot stream are arranged respectively at 14th subcarrier and 35th subcarrier on 1st symbol, at 3rd subcarrier and 24th subcarrier on 5th symbol. The pilots for 5th pilot stream are arranged respectively at 2nd subcarrier and 23th subcarrier on 2nd symbol, at 13th subcarrier and 34th subcarrier on 6th symbol. The pilots for 6th pilot stream are arranged respectively at 3rd subcarrier and 24th subcarrier on 2nd symbol, at 14th subcarrier and 35th subcarrier on 6th symbol.

Preferably, such pilot clusters can also allocated in reserved portion of the exemplary set shown in FIG. 6 or the exemplary set (B) shown in FIG. 9. Preferably, such pilot pattern for 6 pilot streams can also be applicable in subframe with five OFDM symbols or seven OFDM symbols, such as the pilot pattern shown in FIG. 8 or FIG. 11 or FIG. 12. Preferably, permutation of some pilot clusters can also be implemented upon demand.

Figure 16:
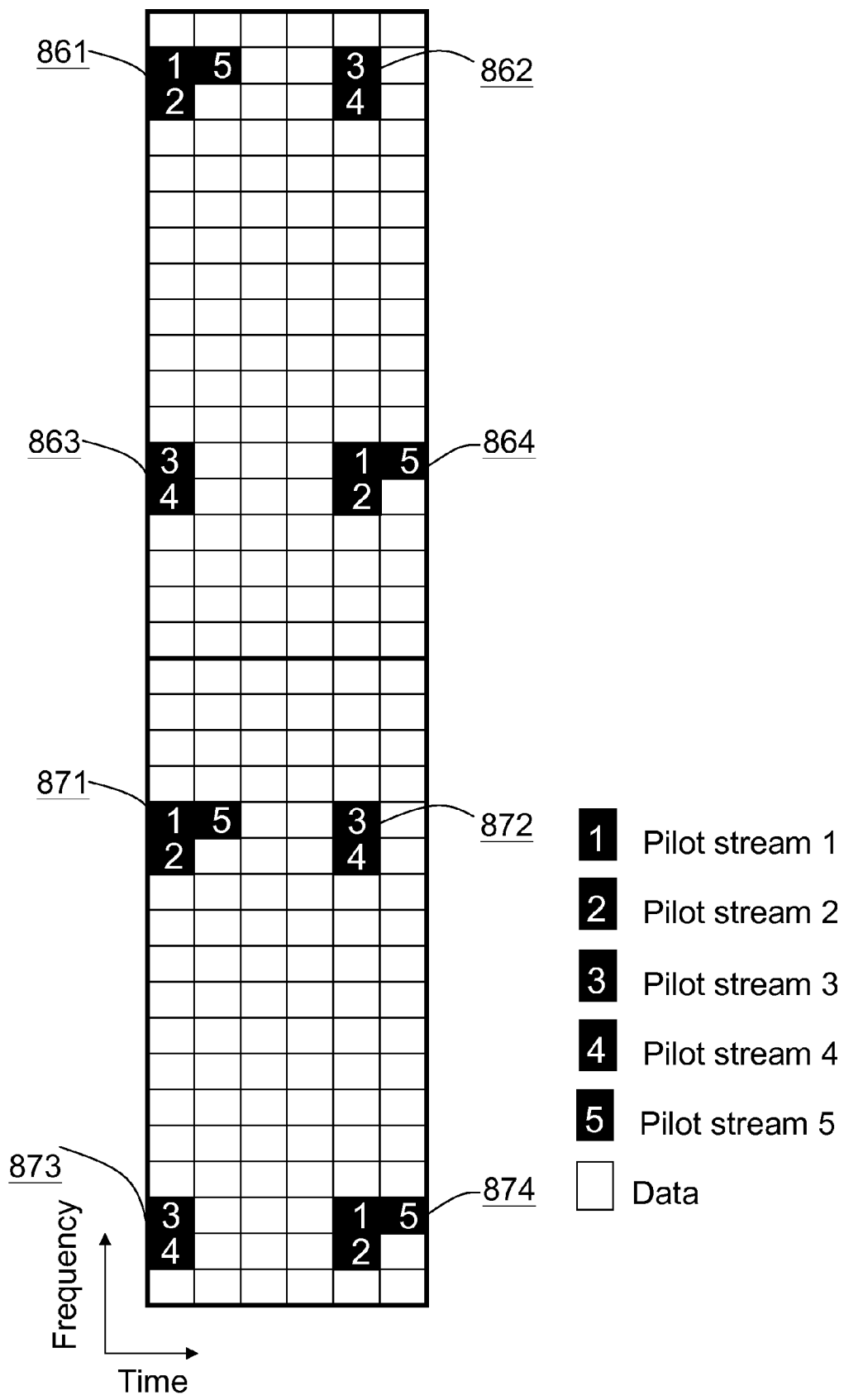
FIG. 16 illustrates a pilot pattern for 5 pilot streams in subframe with six OFDM symbols.

FIG. 16 illustrates pilot pattern for transmission of 5 pilot streams in subframe with six OFDM symbols, and the pilots are allocated in reserved portions of exemplary set (A) shown in FIG. 9. In FIG. 16, pilots for pilot stream 1, pilot stream 2 and pilot stream 5 are grouped into pilot cluster 861, 864, 871 and 874 respectively, and pilots for pilot stream 3 and pilot stream 4 are grouped into pilot cluster 862, 863, 872 and 873 respectively. Pilot cluster 861, 864, 871 and 874 are respectively allocated in portion 601, portion 604, portion 611 and portion 614 of exemplary set (A) shown in FIG. 9, and pilot cluster 862, 863, 872 and 873 are respectively allocated in portion 602, portion 603, portion 612 and portion 613 of exemplary set (A) shown in FIG. 9.

The pilot pattern is shown with the subcarrier index increasing from top to bottom and the OFDM symbol index increasing from left to right. The pilots for 1st pilot stream are arranged respectively at 2nd subcarrier and 23th subcarrier on 1st symbol, at 13th subcarrier and 34th subcarrier on 5th symbol. The pilots for 2nd pilot stream are arranged respectively at 3rd subcarrier and 24th subcarrier on 1st symbol, at 14th subcarrier and 35th subcarrier on 5th symbol. The pilots for 3rd pilot stream are arranged respectively at 13th subcarrier and 34th subcarrier on 1st symbol, at 2nd subcarrier and 23th subcarrier on 5th symbol. The pilots for 4th pilot stream are arranged respectively at 14th subcarrier and 35th subcarrier on 1st symbol, at 3rd subcarrier and 24th subcarrier on 5th symbol. The pilots for 5th pilot stream are arranged respectively at 2nd subcarrier and 23th subcarrier on 2nd symbol, at 13th subcarrier and 34th subcarrier on 6th symbol.

Preferably, such pilot clusters can also allocated in reserved portion of the exemplary set shown in FIG. 6 or the exemplary set (B) shown in FIG. 9. Preferably, such pilot pattern for 5 pilot streams can also be applicable in subframe with five OFDM symbols or seven OFDM symbols, such as the pilot pattern shown in FIG. 8 or FIG. 11 or FIG. 12. Preferably, permutation of some pilot clusters can also be implemented upon demand.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for pilot allocation for transmitting a plurality of pilot streams in a multiple-input-multiple-output (MIMO) antenna system using orthogonal frequency division multiplexing (OFDM) modulation, comprising:

providing two contiguous resource units, each of the resource units comprising OFDM symbols in time domain and subcarriers in frequency domain;

allocating two pilots for each of the plurality of pilot streams in a first resource unit;

allocating two pilots for each of the plurality of pilot streams in a second resource unit based on the pilot allocation in the first resource unit;

grouping the plurality of pilot streams into two pilot stream clusters;

grouping the two pilots for each of the two pilot stream clusters into two pilot clusters; and allocating the two pilot clusters for a first pilot stream cluster and a second pilot stream cluster according to a predefined pattern of reserved portions for the pilot allocation.

2. The method of claim 1, wherein the number of subcarriers is 18.

3. The method of claim 1, wherein the number of OFDM symbols is 5, 6, or 7.

4. The method of claim 1, the step of allocating the two pilot clusters further comprising the steps of:

allocating the first pilot cluster for the first pilot stream cluster at a first portion of the subcarriers on the first portion of the OFDM symbols, and the second pilot cluster for the first pilot stream cluster at a second portion of the subcarriers on a second portion of the OFDM symbols in the first resource unit; and allocating the first pilot cluster for the second pilot stream cluster at the first portion of the subcarriers on the second portion of the OFDM symbols, and the second pilot cluster for the second pilot stream cluster at the second portion of the subcarriers on the first portion of the OFDM symbols in the first resource unit.

5. The method of claim 1, wherein when the number of the plurality of pilot streams is 8, one of the two pilot stream clusters comprises a first pilot stream, a second pilot stream, a fifth pilot stream and a sixth pilot stream, and the other one of the two pilot stream clusters comprises a third pilot stream, a fourth pilot stream, a seventh pilot stream and a eighth pilot stream.

6. The method of claim 1, wherein when the number of the pilot streams is 7, one of the two pilot stream clusters comprises a first pilot stream, a second pilot stream, a fifth pilot stream and a sixth pilot stream, and the other one of the two pilot stream clusters comprises a third pilot stream, a fourth pilot stream and a seventh pilot stream.

7. The method of claim 1, wherein when the number of the pilot streams is 6, one of the two pilot stream clusters comprises a first pilot stream, a second pilot stream, a fifth pilot stream and a sixth pilot stream, and the other one of the two pilot stream clusters comprises a third pilot stream and a fourth pilot stream.

8. The method of claim 1, wherein when the number of the pilot streams is 5, the one of the two pilot stream clusters comprises a first pilot stream, a second pilot stream and a fifth pilot stream, and the other one of the two pilot stream clusters comprises a third pilot stream and a fourth pilot stream.

9. The method of claim 1, wherein relative locations between the pilots in the second resource unit are substantially similar with the relative locations between the pilots in the first resource unit.

10. The method of claim 4, further comprising a step of:
re-permutating the pilots of the second pilot cluster for the first pilot stream cluster.

11. The method of claim 4, further comprising a step of:
re-permutating the pilots of the second pilot cluster for the second pilot stream cluster.

12. The method of claim 4, wherein the second pilot cluster for the second pilot stream cluster in the first resource unit and the first pilot cluster for the first pilot stream cluster in the second resource unit are separated by even number of the subcarriers.

13. The method of claim 1, wherein the number of subcarriers is 18 and the number of OFDM symbols is 5, 6, or 7.

14. The method of claim 1, wherein the two contiguous resource units have the same size and are contiguous in frequency domain.

15. A method for pilot allocation for transmitting a plurality of pilot streams in a multiple-input-multiple-output (MIMO) antenna system using orthogonal frequency division multiplexing (OFDM) modulation, comprising:
providing two contiguous resource units, each of the resource units comprising OFDM symbols in time domain and subcarriers in frequency domain;
allocating two pilots for each of the plurality of pilot streams in a first resource unit;
allocating two pilots for each of the plurality of pilot streams in a second resource unit based on the pilot allocation in the first resource unit;
grouping the plurality of pilot streams into two pilot stream clusters;
grouping the two pilots for each of the two pilot stream clusters into two pilot clusters; and
allocating the two pilot clusters for a first pilot stream cluster and a second pilot stream cluster according to a predefined pattern of reserved portions for the pilot allocation,
wherein predefined pattern of reserved portions is defined by formulas:

$$S_{F,S} = \left\lfloor \frac{N_{SC,f}}{N_{P,f} - 1} \right\rfloor$$

$$N_{S_{F,S}} = N_{P,f} - (N_{SC,f} \bmod (N_{P,f} - 1))$$

$$S_{F,L} = \left\lfloor \frac{N_{SC,f}}{N_{P,f} - 1} \right\rfloor + 1 = S_{F,S} + 1$$

$$N_{S_{F,L}} = (N_{SC,f} \bmod (N_{P,f} - 1)) - 1 = N_{P,f} - N_{S_{F,S}} - 1$$

wherein $N_{p,f}$ is number of the pilots over contiguous resource units in frequency direction, $S_{F,S}$ is short pilot spacing in the subcarriers in frequency direction, $S_{F,L}$ is long pilot spacing in the subcarriers in frequency direction, $N_{SC,f}$ is pilot spacing in the subcarriers between first and last pilots in frequency direction, $NS_{F,S}$ is number of units of short pilot spacing, and $NS_{F,L}$ is number of units of long pilot spacing.

16. A method for pilot allocation for transmitting a plurality of pilot streams in a multiple-input-multiple-output (MIMO) antenna system using orthogonal frequency division multiplexing (OFDM) modulation, comprising:
providing two contiguous resource units, each of two resource units comprising OFDM symbols in time domain and subcarriers in frequency domain;
grouping the plurality of pilot streams into two pilot stream clusters;
providing two pilots for each of the plurality of pilot streams in one resource unit, and the subcarriers for each of the two pilot stream clusters forming the two pilot clusters;
allocating a first pilot cluster for a first pilot stream cluster at a first portion of the subcarriers on a first portion of the OFDM symbols, and a second pilot cluster for the first pilot stream cluster at a second portion of the subcarriers on a second portion of the OFDM symbols in a first resource unit;
allocating the first pilot cluster for a second pilot stream cluster at the first portion of the subcarriers on the second portion of the OFDM symbols, and the second pilot cluster for the second pilot stream cluster at the second portion of the subcarriers on the first portion of the OFDM symbols in the first resource unit; and
arranging the two pilots in a second resource unit based on the pilot allocation in the first resource unit.

17. The method of claim 16, wherein the second pilot cluster for the second pilot stream cluster in the first resource unit and the first pilot cluster for the first pilot stream cluster in the second resource unit are separated by even number of the subcarriers.

18. The method of claim 16, wherein when the number of the plurality of pilot streams is 8, one of the two pilot stream clusters comprises a first pilot stream, a second pilot stream, a fifth pilot stream and a sixth pilot stream, and the other one of the two pilot stream clusters comprises a third pilot stream, a fourth pilot stream, a seventh pilot stream and a eighth pilot stream.

19. The method of claim 16, wherein when the number of the plurality of pilot streams is 7, one of the two pilot stream clusters comprises a first pilot stream, a second pilot stream, a fifth pilot stream and a sixth pilot stream, and the other one of the two pilot stream clusters comprises a third pilot stream, a fourth pilot stream and a seventh pilot stream.

20. The method of claim 16, wherein when the number of the plurality of pilot streams is 6, one of the two pilot stream clusters comprises a first pilot stream, a second pilot stream, a fifth pilot stream and a sixth pilot stream, and the other one of the two pilot stream clusters comprises a third pilot stream and a fourth pilot stream.

21. The method of claim 16, wherein when the number of the plurality of pilot streams is 5, one of the two pilot stream clusters comprises a first pilot stream, a second pilot stream and a fifth pilot stream, and the other one of the two pilot stream clusters comprises a third pilot stream and a fourth pilot stream.

22. The method of claim 16, wherein relative locations between the pilots in the second resource unit are substantially similar with the relative locations between the pilots in the first resource unit.

23. The method of claim 16, further comprising a step of:
re-permutating the pilots of the second pilot cluster for the first pilot stream cluster.

24. The method of claim 16, further comprising a step of:
re-permutating the pilots of the second pilot cluster for the second pilot stream cluster.

25. The method of claim 16, wherein the second pilot cluster for the second pilot stream cluster in the first resource unit and the first pilot cluster for the first pilot stream cluster in the second resource unit are separated by even number of the subcarriers.

26. A wireless communication system using orthogonal frequency division multiplexing (OFDM) modulation, comprising:
a multiple-input-multiple-output (MIMO) antenna;
an OFDM modulator operably connected to the MIMO antenna; and
a processor operably connected to the OFDM modulator, wherein the processor is configured to provide two contiguous resource unit, and each of the two resource unit comprising OFDM symbols in time domain and subcarriers in frequency domain, and to allocate two pilots for each of multiple pilot streams in one resource unit, wherein the pilots location for the pilot streams in a second resource unit is corresponding to the pilot allocation in a first resource unit;

wherein the processor further groups the pilot streams into two pilot stream clusters, and groups pilots for each pilot stream cluster into two pilot clusters, and allocates the pilot clusters for a first pilot stream cluster and a second pilot stream cluster according to a predefined pattern of reserved portions for allocating the pilots.

27. The wireless communication system of claim 26, wherein the pilot streams are respectively transmitted by antennas included in the MIMO antenna.

28. The wireless communication system of claim 26, wherein the processor further allocates a first pilot cluster for the first pilot stream cluster at a first portion of subcarriers on a first portion of the OFDM symbols, and the second pilot cluster for the first pilot stream cluster at a second portion of the subcarriers on a second portion of the OFDM symbols in the first resource unit, and allocates the first pilot cluster for the second pilot stream cluster at a first portion of the subcarriers on the second portion of the OFDM symbols, and the second pilot cluster for the second pilot stream cluster at the second portion of the subcarriers on the first portion of the OFDM symbols in the first resource unit.

29. The wireless communication system of claim 28, wherein the processor further re-permutates the pilots of the second pilot cluster for the first pilot stream cluster.

30. The wireless communication system of claim 28, wherein the processor further re-permutates the pilots of the second pilot cluster for the second pilot stream cluster.

31. The wireless communication system of claim 26, wherein when the number of the pilot streams is 8, one of the two pilot stream clusters comprises a first pilot stream, a second pilot stream, a fifth pilot stream and a sixth pilot stream, and the other one of the two pilot stream clusters comprises a third pilot stream, a fourth pilot stream, a seventh pilot stream and a eighth pilot stream.

32. The wireless communication system of claim 26, wherein when the number of the pilot streams is 7, one of the two pilot stream clusters comprises a first pilot stream, a second pilot stream, a fifth pilot stream and a sixth pilot stream, and the other one of the two pilot stream clusters comprises a third pilot stream, a fourth pilot stream and a seventh pilot stream.

33. The wireless communication system of claim 26, wherein when the number of the pilot streams is 6, one of the two pilot stream clusters comprises a first pilot stream, a second pilot stream, a fifth pilot stream and a sixth pilot stream, and the other one of the two pilot stream clusters comprises a third pilot stream and a fourth pilot stream.

34. The wireless communication system of claim 26, wherein relative locations between the pilots in the second resource unit are substantially similar with the relative locations between the pilots in the first resource unit.

35. The wireless communication system of claim 26, wherein the number of subcarriers is 18 and the number of OFDM symbols is 5, 6, or 7.

36. The wireless communication system of claim 26, wherein when the number of the pilot streams is 5, one of the two pilot stream clusters comprises a first pilot stream, a second pilot stream and a fifth pilot stream, and the other one of the two pilot stream clusters comprises a third pilot stream and a fourth pilot stream.

37. The wireless communication system of claim 26, wherein the two contiguous resource units have the same size and are contiguous in frequency domain.

38. A wireless communication system using orthogonal frequency division multiplexing (OFDM) modulation, comprising:
a multiple-input-multiple-output (MIMO) antenna;
an OFDM modulator operably connected to the MIMO antenna; and
a processor operably connected to the OFDM modulator, wherein the processor is configured to provide two contiguous resource unit, and each of the two resource unit comprising OFDM symbols in time domain and subcarriers in frequency domain, and to allocate two pilots for each of multiple pilot streams in one resource unit, wherein the pilots location for the pilot streams in a second resource unit is corresponding to the pilot allocation in a first resource unit;
wherein the processor further groups the pilot streams into two pilot stream clusters, and groups pilots for each pilot stream cluster into two pilot clusters, and allocates the pilot clusters for a first pilot stream cluster and a second pilot stream cluster according to a predefined pattern of reserved portions for allocating the pilots;
wherein the predefined pattern of reserved portions is defined by formulas:

$$S_{F,S} = \left\lfloor \frac{N_{SC,f}}{N_{P,f} - 1} \right\rfloor$$

$$N_{S_{F,S}} = N_{P,f} - (N_{SC,f} \bmod (N_{P,f} - 1))$$

$$S_{F,L} = \left\lfloor \frac{N_{SC,f}}{N_{P,f} - 1} \right\rfloor + 1 = S_{F,S} + 1$$

$$N_{S_{F,L}} = (N_{SC,f} \bmod (N_{P,f} - 1)) - 1 = N_{P,f} - N_{S_{F,S}} - 1$$

wherein $N_{p,f}$ is number of pilots over contiguous resource units in frequency direction, $S_{F,S}$ is short pilot spacing in subcarriers in frequency direction, $S_{F,L}$ is long pilot spacing in subcarriers in frequency direction, $N_{SC,f}$ is pilot spacing in subcarriers between first and last pilots in frequency direction, $NS_{F,S}$ is number of units of short pilot spacing, and $NS_{F,L}$ is number of units of long pilot spacing.

39. A wireless communication system using orthogonal frequency division multiplexing (OFDM) modulation, comprising:
a multiple-input-multiple-output (MIMO) antenna;
an OFDM modulator operably connected to the MIMO antenna; and
a processor operably connected to the OFDM modulator, wherein the processor is configured to provide two contiguous resource unit, and each of the two resource unit comprising OFDM symbols in time domain and subcarriers in frequency domain, and to allocate two pilots for each of multiple pilot streams in one resource unit, wherein the pilots location for the pilot streams in a second resource unit is corresponding to the pilot allocation in a first resource unit;
wherein the processor further groups the pilot streams into two pilot stream clusters, and groups pilots for each pilot stream cluster into two pilot clusters, and allocates the pilot clusters for a first pilot stream cluster and a second pilot stream cluster according to a predefined pattern of reserved portions for allocating the pilots:

wherein when the number of the pilot streams is 8, the number of the subcarriers of each resource unit is 18 and the number of the OFDM symbols of each resource unit is 6;

wherein the pilots for a 1st pilot stream are allocated respectively at a 2nd subcarrier and a 23rd subcarrier on a 1st symbol, at a 13th subcarrier and a 34th subcarrier on a 5th symbol;

wherein the pilots for a 2nd pilot stream are arranged respectively at a 3rd subcarrier and a 24th subcarrier on the 1st symbol, at a 14th subcarrier and a 35th subcarrier on the 5th symbol;

wherein the pilots for a 3rd pilot stream are arranged respectively at the 13th subcarrier and the 34th subcarrier on the 1st symbol, at the 2nd subcarrier and the 23rd subcarrier on the 5th symbol;

wherein the pilots for a 4th pilot stream are arranged respectively at the 14th subcarrier and the 35th subcarrier on the 1st symbol, at the 3rd subcarrier and the 24th subcarrier on the 5th symbol;

wherein the pilots for a 5th pilot stream are arranged respectively at the 2nd subcarrier and the 23rd subcarrier on a 2nd symbol, at the 13th subcarrier and the 34th subcarrier on a 6th symbol;

wherein the pilots for a 6th pilot stream are arranged respectively at the 3rd subcarrier and the 24th subcarrier on the 2nd symbol, at the 14th subcarrier and the 35th subcarrier on the 6th symbol;

wherein the pilots for a 7th pilot stream are arranged respectively at the 13th subcarrier and the 34th subcarrier on the 2nd symbol, at the 2nd subcarrier and the 23rd subcarrier on the 6th symbol; and wherein the pilots for a 8th pilot stream are arranged respectively at the 14th subcarrier and the 35th subcarrier on the 2nd symbol, at the 3rd subcarrier and the 24th subcarrier on the 6th symbol.

40. A wireless communication system using orthogonal frequency division multiplexing (OFDM) modulation, comprising:

a multiple-input-multiple-output (MIMO) antenna;

an OFDM modulator operably connected to the MIMO antenna; and a processor operably connected to the OFDM modulator, wherein the processor is configured to provide two contiguous resource unit, and each of the two resource unit comprising OFDM symbols in time domain and subcarriers in frequency domain, and to allocate two pilots for each of multiple pilot streams in one resource unit, wherein the pilots location for the pilot streams in a second resource unit is corresponding to the pilot allocation in a first resource unit;

wherein the processor further groups the pilot streams into two pilot stream clusters, and groups pilots for each pilot stream cluster into two pilot clusters, and allocates the pilot clusters for a first pilot stream cluster and a second pilot stream cluster according to a predefined pattern of reserved portions for allocating the pilots:

wherein when the number of the pilot streams is 8, the number of subcarriers of each resource unit is 18 and the number of OFDM symbols of each resource unit is 5;

wherein the pilots for a 1st pilot stream are arranged respectively at a 2nd subcarrier and a 23rd subcarrier on a 1st symbol, at a 13th subcarrier and a 34th subcarrier on a 4th symbol;

wherein the pilots for a 2nd pilot stream are arranged respectively at a 3rd subcarrier and a 24th subcarrier on a 1st symbol, at a 14th subcarrier and a 35th subcarrier on the 4th symbol;

wherein the pilots for a 3rd pilot stream are arranged respectively at the 13th subcarrier and the 34th subcarrier on the 1st symbol, at the 2nd subcarrier and the 23rd subcarrier on the 4th symbol;

wherein the pilots for a 4th pilot stream are arranged respectively at the 14th subcarrier and the 35th subcarrier on the 1st symbol, at the 3rd subcarrier and the 24th subcarrier on the 4th symbol;

wherein the pilots for a 5th pilot stream are arranged respectively at the 2nd subcarrier and the 23rd subcarrier on a 2nd symbol, at the 13th subcarrier and the 34th subcarrier on a 5th symbol;

wherein the pilots for a 6th pilot stream are arranged respectively at the 3rd subcarrier and the 24th subcarrier on the 2nd symbol, at the 14th subcarrier and the 35th subcarrier on the 5th symbol;

wherein the pilots for a 7th pilot stream are arranged respectively at the 13th subcarrier and the 34th subcarrier on the 2nd symbol, at the 2nd subcarrier and the 23rd subcarrier on the 5th symbol; and wherein the pilots for a 8th pilot stream are arranged respectively at the 14th subcarrier and 35th subcarrier on the 2nd symbol, at the 3rd subcarrier and the 24th subcarrier on the 5th symbol.

41. A wireless communication system using orthogonal frequency division multiplexing (OFDM) modulation, comprising:

a multiple-input-multiple-output (MIMO) antenna;

an OFDM modulator operably connected to the MIMO antenna; and a processor operably connected to the OFDM modulator, wherein the processor is configured to provide two contiguous resource unit, and each of the two resource unit comprising OFDM symbols in time domain and subcarriers in frequency domain, and to allocate two pilots for each of multiple pilot streams in one resource unit, wherein the pilots location for the pilot streams in a second resource unit is corresponding to the pilot allocation in a first resource unit;

wherein the processor further groups the pilot streams into two pilot stream clusters, and groups pilots for each pilot stream cluster into two pilot clusters, and allocates the pilot clusters for a first pilot stream cluster and a second pilot stream cluster according to a predefined pattern of reserved portions for allocating the pilots;

wherein when the number of the pilot streams is 8, the number of subcarriers of each resource unit is 18 and the number of OFDM symbols of each resource unit is 7;

wherein the pilots for a 1st pilot stream are arranged respectively at a 2nd subcarrier and a 23rd subcarrier on a 1st symbol, at a 13th subcarrier and a 34th subcarrier on a 5th symbol;

wherein the pilots for a 2nd pilot stream are arranged respectively at a 3rd subcarrier and a 24th subcarrier on the 1st symbol, at a 14th subcarrier and a 35th subcarrier on the 5th symbol;

wherein the pilots for a 3rd pilot stream are arranged respectively at a 13th subcarrier and the 34th subcarrier on the 1st symbol, at the 2nd subcarrier and the 23rd subcarrier on the 5th symbol;

wherein the pilots for a 4th pilot stream are arranged respectively at the 14th subcarrier and the 35th subcarrier on the 1st symbol, at the 3rd subcarrier and the 24th subcarrier on the 5th symbol;

wherein the pilots for a 5th pilot stream are arranged respectively at the 2nd subcarrier and the 23rd subcarrier on a 2nd symbol, at the 13th subcarrier and the 34th subcarrier on a 6th symbol;

wherein the pilots for a 6th pilot stream are arranged respectively at the 3rd subcarrier and the 24th subcarrier on the 2nd symbol, at the 14th subcarrier and the 35th subcarrier on the 6th symbol;

wherein the pilots for a 7th pilot stream are arranged respectively at the 13th subcarrier and the 34th subcarrier on the 2nd symbol, at the 2nd subcarrier and the 23rd subcarrier on the 6th symbol; and wherein the pilots for a 8th pilot stream are arranged respectively at the 14th subcarrier and the 35th subcarrier on the 2nd symbol, at the 3rd subcarrier and the 24th subcarrier on the 6th symbol.

42. A wireless communication system using orthogonal frequency division multiplexing (OFDM) modulation, comprising:
a multiple-input-multiple-output (MIMO) antenna;
an OFDM modulator operably connected to the MIMO antenna; and
a processor operably connected to the OFDM modulator, wherein the processor is configured to provide two contiguous resource unit, and each of the two resource unit comprising OFDM symbols in time domain and subcarriers in frequency domain, and to allocate two pilots for each of multiple pilot streams in one resource unit, wherein the pilots location for the pilot streams in a second resource unit is corresponding to the pilot allocation in a first resource unit;
wherein the processor further groups the pilot streams into two pilot stream clusters, and groups pilots for each pilot stream cluster into two pilot clusters, and allocates the pilot clusters for a first pilot stream cluster and a second pilot stream cluster according to a predefined pattern of reserved portions for allocating the pilots;
wherein when the number of the pilot streams is 8, the number of the subcarriers of each resource unit is 18 and the number of the OFDM symbols of each resource unit is 6;
wherein the pilots for a 1st pilot stream are arranged respectively at a 2nd subcarrier on a 1st symbol, at a 13th subcarrier on a 6th symbol, at a 23rd subcarrier on a 2nd symbol, and at a 34th subcarrier on a 5th symbol;
wherein the pilots for a 2nd pilot stream are arranged respectively at a 3rd subcarrier on the 1st symbol, at a 14th subcarrier on the 6th symbol, at a 24th subcarrier on the 2nd symbol, and at a 35th subcarrier on the 5th symbol;
wherein the pilots for a 3rd pilot stream are arranged respectively at the 2nd subcarrier on the 5th symbol, at the 13th subcarrier on the 2nd symbol, at the 23rd subcarrier on the 6th symbol, and at the 34th subcarrier on the 1st symbol;
wherein the pilots for a 4th pilot stream are arranged respectively at the 3rd subcarrier on the 5th symbol, at the 14th subcarrier on the 2nd symbol, at the 24th subcarrier on the 6th symbol, and at the 35th subcarrier on the 1st symbol;
wherein the pilots for a 5th pilot stream are arranged respectively at the 2nd subcarrier on the 2nd symbol, at the 13th subcarrier on the 5th symbol, at the 23rd subcarrier on the 1st symbol, and at the 34th subcarrier on the 6th symbol;

wherein the pilots for a 6th pilot stream are arranged respectively at the 3rd subcarrier on the 2nd symbol, at the 14th subcarrier on the 5th symbol, at the 24th subcarrier on the 1st symbol, and at the 35th subcarrier on the 6th symbol;

wherein the pilots for a 7th pilot stream are arranged respectively at the 2nd subcarrier on the 6th symbol, at the 13th subcarrier on the 1st symbol, at the 23rd subcarrier on the 5th symbol, and at the 34th subcarrier on the 2nd symbol; and wherein the pilots for a 8th pilot stream are arranged respectively at the 3rd subcarrier on the 6th symbol, at the 14th subcarrier on the 1st symbol, at the 24th subcarrier on the 5th symbol, and at the 35th subcarrier on the 2nd symbol.

43. A wireless communication system using orthogonal frequency division multiplexing (OFDM) modulation, comprising:
a multiple-input-multiple-output (MIMO) antenna;
an OFDM modulator operably connected to the MIMO antenna; and
a processor operably connected to the OFDM modulator, wherein the processor is configured to provide two contiguous resource unit, and each of the two resource unit comprising OFDM symbols in time domain and subcarriers in frequency domain, and to allocate two pilots for each of multiple pilot streams in one resource unit, wherein the pilots location for the pilot streams in a second resource unit is corresponding to the pilot allocation in a first resource unit;
wherein the processor further groups the pilot streams into two pilot stream clusters, and groups pilots for each pilot stream cluster into two pilot clusters, and allocates the pilot clusters for a first pilot stream cluster and a second pilot stream cluster according to a predefined pattern of reserved portions for allocating the pilots;
wherein when the number of the pilot streams is 8, the number of the subcarriers of each resource unit is 18 and the number of the OFDM symbols of each resource unit is 5;
wherein the pilots for a 1st pilot stream are arranged respectively at a 2nd subcarrier on a 1st symbol, at a 13th subcarrier on a 5th symbol, at a 23rd subcarrier on a 2nd symbol, and at a 34th subcarrier on a 4th symbol;
wherein the pilots for a 2nd pilot stream are arranged respectively at a 3rd subcarrier on the 1st symbol, at a 14th subcarrier on the 5th symbol, at a 24th subcarrier on the 2nd symbol, and at a 35th subcarrier on the 4th symbol;
wherein the pilots for a 3rd pilot stream are arranged respectively at the 2nd subcarrier on the 4th symbol, at the 13th subcarrier on the 2nd symbol, at the 23rd subcarrier on the 5th symbol, and at the 34th subcarrier on the 1st symbol;
wherein the pilots for a 4th pilot stream are arranged respectively at the 3rd subcarrier on the 4th symbol, at the 14th subcarrier on the 2nd symbol, at the 24th subcarrier on the 5th symbol, and at the 35th subcarrier on the 1st symbol;
wherein the pilots for a 5th pilot stream are arranged respectively at the 2nd subcarrier on the 2nd symbol, at the 13th subcarrier on the 4th symbol, at the 23rd subcarrier on the 1st symbol, and at the 34th subcarrier on the 5th symbol;
wherein the pilots for a 6th pilot stream are arranged respectively at the 3rd subcarrier on the 2nd symbol, at the 14th subcarrier on the 4th symbol, at the 24th subcarrier on the 1st symbol, and at the 35th subcarrier on the 5th symbol;

wherein the pilots for a 7th pilot stream are arranged respectively at the 2nd subcarrier on the 5th symbol, at the 13th subcarrier on the 1st symbol, at the 23rd subcarrier on the 4th symbol, and at the 34th subcarrier on the 2nd symbol; and wherein the pilots for a 8th pilot stream are arranged respectively at the 3rd subcarrier on the 5th symbol, at the 14th subcarrier on the 1st symbol, at the 24th subcarrier on the 4th symbol, and at the 35th subcarrier on the 2nd symbol.

44. A wireless communication system using orthogonal frequency division multiplexing (OFDM) modulation, comprising:

a multiple-input-multiple-output (MIMO) antenna;

an OFDM modulator operably connected to the MIMO antenna; and a processor operably connected to the OFDM modulator, wherein the processor is configured to provide two contiguous resource unit, and each of the two resource unit comprising OFDM symbols in time domain and subcarriers in frequency domain, and to allocate two pilots for each of multiple pilot streams in one resource unit, wherein the pilots location for the pilot streams in a second resource unit is corresponding to the pilot allocation in a first resource unit;

wherein the processor further groups the pilot streams into two pilot stream clusters, and groups pilots for each pilot stream cluster into two pilot clusters, and allocates the pilot clusters for a first pilot stream cluster and a second pilot stream cluster according to a predefined pattern of reserved portions for allocating the pilots;

wherein when the number of the pilot streams is 8, the number of the subcarriers of each resource unit is 18 and the number of the OFDM symbols of each resource unit is 7;

wherein the pilots for a 1st pilot stream are arranged respectively at a 2nd subcarrier on a 1st symbol, at a 13th subcarrier on a 6th symbol, at a 23rd subcarrier on a 2nd symbol, and at a 34th subcarrier on a 5th symbol;

wherein the pilots for a 2nd pilot stream are arranged respectively at a 3rd subcarrier on the 1st symbol, at a 14th subcarrier on the 6th symbol, at a 24th subcarrier on the 2nd symbol, and at a 35th subcarrier on the 5th symbol;

wherein the pilots for a 3rd pilot stream are arranged respectively at the 2nd subcarrier on the 5th symbol, at the 13th subcarrier on the 2nd symbol, at the 23rd subcarrier on the 6th symbol, and at the 34th subcarrier on the 1st symbol;

wherein the pilots for a 4th pilot stream are arranged respectively at the 3rd subcarrier on the 5th symbol, at the 14th subcarrier on the 2nd symbol, at the 24th subcarrier on the 6th symbol, and at the 35th subcarrier on the 1st symbol;

wherein the pilots for a 5th pilot stream are arranged respectively at the 2nd subcarrier on the 2nd symbol, at the 13th subcarrier on the 5th symbol, at the 23rd subcarrier on the 1st symbol, and at the 34th subcarrier on the 6th symbol;

wherein the pilots for a 6th pilot stream are arranged respectively at the 3rd subcarrier on the 2nd symbol, at the 14th subcarrier on the 5th symbol, at the 24th subcarrier on the 1st symbol, and at the 35th subcarrier on the 6th symbol;

wherein the pilots for a 7th pilot stream are arranged respectively at the 2nd subcarrier on the 6th symbol, at the 13th subcarrier on the 1st symbol, at the 23rd subcarrier on the 5th symbol, and at the 34th subcarrier on the 2nd symbol; and wherein the pilots for a 8th pilot stream are arranged respectively at the 3rd subcarrier on the 6th symbol, at the 14th subcarrier on the 1st symbol, at the 24th subcarrier on the 5th symbol, and at the 35th subcarrier on the 2nd symbol.

45. A wireless communication system using orthogonal frequency division multiplexing (OFDM) modulation, comprising:

a multiple-input-multiple-output (MIMO) antenna;

an OFDM modulator operably connected to the MIMO antenna; and a processor operably connected to the OFDM modulator, wherein the processor is configured to provide two contiguous resource unit, and each of the two resource unit comprising OFDM symbols in time domain and subcarriers in frequency domain, and to allocate two pilots for each of multiple pilot streams in one resource unit, wherein the pilots location for the pilot streams in a second resource unit is corresponding to the pilot allocation in a first resource unit;

wherein the processor further groups the pilot streams into two pilot stream clusters, and groups pilots for each pilot stream cluster into two pilot clusters, and allocates the pilot clusters for a first pilot stream cluster and a second pilot stream cluster according to a predefined pattern of reserved portions for allocating the pilots;

wherein when the number of the pilot streams is 7, the number of the subcarriers of each resource unit is 18 and the number of the OFDM symbols of each resource unit is 6;

wherein the pilots for a 1st pilot stream are arranged respectively at a 2nd subcarrier on a 1st symbol, at a 13th subcarrier on a 6th symbol, at a 23rd subcarrier on a 2nd symbol, and at a 34th subcarrier on a 5th symbol;

wherein the pilots for a 2nd pilot stream are arranged respectively at a 3rd subcarrier on the 1st symbol, at a 14th subcarrier on the 6th symbol, at a 24th subcarrier on the 2nd symbol, and at a 35th subcarrier on the 5th symbol;

wherein the pilots for a 3rd pilot stream are arranged respectively at the 2nd subcarrier on the 5th symbol, at the 13th subcarrier on the 2nd symbol, at the 23rd subcarrier on the 6th symbol, and at the 34th subcarrier on the 1st symbol;

wherein the pilots for a 4th pilot stream are arranged respectively at the 3rd subcarrier on the 5th symbol, at the 14th subcarrier on the 2nd symbol, at the 24th subcarrier on the 6th symbol, and at the 35th subcarrier on the 1st symbol;

wherein the pilots for a 5th pilot stream are arranged respectively at the 2nd subcarrier on the 2nd symbol, at the 13th subcarrier on the 5th symbol, at the 23rd subcarrier on the 1st symbol, and at the 34th subcarrier on the 6th symbol;

wherein the pilots for a 6th pilot stream are arranged respectively at the 3rd subcarrier on the 2nd symbol, at the 14th subcarrier on the 5th symbol, at the 24th subcarrier on the 1st symbol, and at the 35th subcarrier on the 6th symbol; and wherein the pilots for a 7th pilot stream are arranged respectively at the 2nd subcarrier on the 6th symbol, at the 13th subcarrier on the 1st symbol, at the 23rd subcarrier on the 5th symbol, and at the 34th subcarrier on the 2nd symbol.

46. A wireless communication system using orthogonal frequency division multiplexing (OFDM) modulation, comprising:

a multiple-input-multiple-output (MIMO) antenna;

an OFDM modulator operably connected to the MIMO antenna; and a processor operably connected to the OFDM modulator, wherein the processor is configured to provide two contiguous resource unit, and each of the two resource unit comprising OFDM symbols in time domain and subcarriers in frequency domain, and to allocate two pilots for each of multiple pilot streams in one resource unit, wherein the pilots location for the pilot streams in a second resource unit is corresponding to the pilot allocation in a first resource unit;

wherein the processor further groups the pilot streams into two pilot stream clusters, and groups pilots for each pilot stream cluster into two pilot clusters, and allocates the pilot clusters for a first pilot stream cluster and a second pilot stream cluster according to a predefined pattern of reserved portions for allocating the pilots;

wherein when the number of the pilot streams is 7, the number of the subcarriers of each resource unit is 18 and the number of the OFDM symbols of each resource unit is 5;

wherein the pilots for a 1st pilot stream are arranged respectively at a 2nd subcarrier on a 1st symbol, at a 13th subcarrier on a 5th symbol, at a 23rd subcarrier on a 2nd symbol, and at a 34th subcarrier on a 4th symbol;

wherein the pilots for a 2nd pilot stream are arranged respectively at a 3rd subcarrier on the 1st symbol, at a 14th subcarrier on the 5th symbol, at a 24th subcarrier on the 2nd symbol, and at a 35th subcarrier on the 4th symbol;

wherein the pilots for a 3rd pilot stream are arranged respectively at the 2nd subcarrier on the 4th symbol, at the 13th subcarrier on the 2nd symbol, at the 23rd subcarrier on the 5th symbol, and at the 34th subcarrier on the 1st symbol;

wherein the pilots for a 4th pilot stream are arranged respectively at the 3rd subcarrier on the 4th symbol, at the 14th subcarrier on the 2nd symbol, at the 24th subcarrier on the 5th symbol, and at the 35th subcarrier on the 1st symbol;

wherein the pilots for a 5th pilot stream are arranged respectively at the 2nd subcarrier on the 2nd symbol, at the 13th subcarrier on the 4th symbol, at the 23rd subcarrier on the 1st symbol, and at the 34th subcarrier on the 5th symbol;

wherein the pilots for a 6th pilot stream are arranged respectively at the 3rd subcarrier on the 2nd symbol, at the 14th subcarrier on the 4th symbol, at the 24th subcarrier on the 1st symbol, and at the 35th subcarrier on the 5th symbol; and wherein the pilots for a 7th pilot stream are arranged respectively at the 2nd subcarrier on the 5th symbol, at the 13th subcarrier on the 1st symbol, at the 23rd subcarrier on the 4th symbol, and at the 34th subcarrier on the 2nd symbol.

47. A wireless communication system using orthogonal frequency division multiplexing (OFDM) modulation, comprising:

a multiple-input-multiple-output (MIMO) antenna;

an OFDM modulator operably connected to the MIMO antenna; and a processor operably connected to the OFDM modulator, wherein the processor is configured to provide two contiguous resource unit, and each of the two resource unit comprising OFDM symbols in time domain and subcarriers in frequency domain, and to allocate two pilots for each of multiple pilot streams in one resource unit, wherein the pilots location for the pilot streams in a second resource unit is corresponding to the pilot allocation in a first resource unit;

wherein the processor further groups the pilot streams into two pilot stream clusters, and groups pilots for each pilot stream cluster into two pilot clusters, and allocates the pilot clusters for a first pilot stream cluster and a second pilot stream cluster according to a predefined pattern of reserved portions for allocating the pilots;

wherein when the number of the pilot streams is 7, the number of the subcarriers of each resource unit is 18 and the number of the OFDM symbols of each resource unit is 7;

wherein the pilots for a 1st pilot stream are arranged respectively at a 2nd subcarrier on a 1st symbol, at a 13th subcarrier on a 6th symbol, at a 23rd subcarrier on a 2nd symbol, and at a 34th subcarrier on a 5th symbol;

wherein the pilots for a 2nd pilot stream are arranged respectively at a 3rd subcarrier on the 1st symbol, at a 14th subcarrier on the 6th symbol, at a 24th subcarrier on the 2nd symbol, and at a 35th subcarrier on the 5th symbol;

wherein the pilots for a 3rd pilot stream are arranged respectively at the 2nd subcarrier on the 5th symbol, at the 13th subcarrier on the 2nd symbol, at the 23rd subcarrier on the 6th symbol, and at the 34th subcarrier on the 1st symbol;

wherein the pilots for a 4th pilot stream are arranged respectively at the 3rd subcarrier on the 5th symbol, at the 14th subcarrier on the 2nd symbol, at the 24th subcarrier on the 6th symbol, and at the 35th subcarrier on the 1st symbol;

wherein the pilots for a 5th pilot stream are arranged respectively at the 2nd subcarrier on the 2nd symbol, at the 13th subcarrier on the 5th symbol, at the 23rd subcarrier on the 1st symbol, and at the 34th subcarrier on the 6th symbol;

wherein the pilots for a 6th pilot stream are arranged respectively at the 3rd subcarrier on the 2nd symbol, at the 14th subcarrier on the 5th symbol, at the 24th subcarrier on the 1st symbol, and at the 35th subcarrier on the 6th symbol; and wherein the pilots for a 7th pilot stream are arranged respectively at the 2nd subcarrier on the 6th symbol, at the 13th subcarrier on the 1st symbol, at the 23rd subcarrier on the 5th symbol, and at the 34th subcarrier on the 2nd symbol.

48. A wireless communication system using orthogonal frequency division multiplexing (OFDM) modulation, comprising:

a multiple-input-multiple-output (MIMO) antenna;

an OFDM modulator operably connected to the MIMO antenna; and a processor operably connected to the OFDM modulator, wherein the processor is configured to provide two contiguous resource unit, and each of the two resource unit comprising OFDM symbols in time domain and subcarriers in frequency domain, and to allocate two pilots for each of multiple pilot streams in one resource unit, wherein the pilots location for the pilot streams in a second resource unit is corresponding to the pilot allocation in a first resource unit;

wherein the processor further groups the pilot streams into two pilot stream clusters, and groups pilots for each pilot stream cluster into two pilot clusters, and allocates the pilot clusters for a first pilot stream cluster and a second pilot stream cluster according to a predefined pattern of reserved portions for allocating the pilots:

wherein when the number of the pilot streams is 6, the number of the subcarriers of each resource unit is 18 and the number of the OFDM symbols of each resource unit is 6;

wherein the pilots for a 1st pilot stream are arranged respectively at a 2nd subcarrier on a 1st symbol, at a 13th subcarrier on a 6th symbol, at a 23rd subcarrier on a 2nd symbol, and at a 34th subcarrier on a 5th symbol;

wherein the pilots for a 2nd pilot stream are arranged respectively at a 3rd subcarrier on the 1st symbol, at a 14th subcarrier on the 6th symbol, at a 24th subcarrier on the 2nd symbol, and at a 35th subcarrier on the 5th symbol;

wherein the pilots for a 3rd pilot stream are arranged respectively at the 2nd subcarrier on the 5th symbol, at the 13th subcarrier on the 2nd symbol, at the 23rd subcarrier on the 6th symbol, and at the 34th subcarrier on the 1st symbol;

wherein the pilots for a 4th pilot stream are arranged respectively at the 3rd subcarrier on the 5th symbol, at the 14th subcarrier on the 2nd symbol, at the 24th subcarrier on the 6th symbol, and at the 35th subcarrier on the 1st symbol;

wherein the pilots for a 5th pilot stream are arranged respectively at the 2nd subcarrier on the 2nd symbol, at the 13th subcarrier on the 5th symbol, at the 23rd subcarrier on the 1st symbol, and at the 34th subcarrier on the 6th symbol; and wherein the pilots for a 6th pilot stream are arranged respectively at the 3rd subcarrier on the 2nd symbol, at the 14th subcarrier on the 5th symbol, at the 24th subcarrier on the 1st symbol, and at the 35th subcarrier on the 6th symbol.

49. A wireless communication system using orthogonal frequency division multiplexing (OFDM) modulation, comprising:

a multiple-input-multiple-output (MIMO) antenna;

an OFDM modulator operably connected to the MIMO antenna; and a processor operably connected to the OFDM modulator, wherein the processor is configured to provide two contiguous resource unit, and each of the two resource unit comprising OFDM symbols in time domain and subcarriers in frequency domain, and to allocate two pilots for each of multiple pilot streams in one resource unit, wherein the pilots location for the pilot streams in a second resource unit is corresponding to the pilot allocation in a first resource unit;

wherein the processor further groups the pilot streams into two pilot stream clusters, and groups pilots for each pilot stream cluster into two pilot clusters, and allocates the pilot clusters for a first pilot stream cluster and a second pilot stream cluster according to a predefined pattern of reserved portions for allocating the pilots;

wherein when the number of the pilot streams is 6, the number of the subcarriers of each resource unit is 18 and the number of the OFDM symbols of each resource unit is 5;

wherein the pilots for a 1st pilot stream are arranged respectively at a 2nd subcarrier on a 1st symbol, at a 13th subcarrier on a 5th symbol, at a 23rd subcarrier on a 2nd symbol, and at a 34th subcarrier on a 4th symbol;

wherein the pilots for a 2nd pilot stream are arranged respectively at a 3rd subcarrier on the 1st symbol, at a 14th subcarrier on the 5th symbol, at a 24th subcarrier on the 2nd symbol, and at a 35th subcarrier on the 4th symbol;

wherein the pilots for a 3rd pilot stream are arranged respectively at the 2nd subcarrier on the 4th symbol, at the 13th subcarrier on the 2nd symbol, at the 23rd subcarrier on the 5th symbol, and at the 34th subcarrier on the 1st symbol;

wherein the pilots for a 4th pilot stream are arranged respectively at the 3rd subcarrier on the 4th symbol, at the 14th subcarrier on the 2nd symbol, at the 24th subcarrier on the 5th symbol, and at the 35th subcarrier on the 1st symbol;

wherein the pilots for a 5th pilot stream are arranged respectively at the 2nd subcarrier on the 2nd symbol, at the 13th subcarrier on the 4th symbol, at the 23rd subcarrier on the 1st symbol, and at the 34th subcarrier on the 5th symbol; and wherein the pilots for a 6th pilot stream are arranged respectively at the 3rd subcarrier on the 2nd symbol, at the 14th subcarrier on the 4th symbol, at the 24th subcarrier on the 1st symbol, and at the 35th subcarrier on the 5th symbol.

50. A wireless communication system using orthogonal frequency division multiplexing (OFDM) modulation, comprising:

a multiple-input-multiple-output (MIMO) antenna;

an OFDM modulator operably connected to the MIMO antenna; and a processor operably connected to the OFDM modulator, wherein the processor is configured to provide two contiguous resource unit, and each of the two resource unit comprising OFDM symbols in time domain and subcarriers in frequency domain, and to allocate two pilots for each of multiple pilot streams in one resource unit, wherein the pilots location for the pilot streams in a second resource unit is corresponding to the pilot allocation in a first resource unit;

wherein the processor further groups the pilot streams into two pilot stream clusters, and groups pilots for each pilot stream cluster into two pilot clusters, and allocates the pilot clusters for a first pilot stream cluster and a second pilot stream cluster according to a predefined pattern of reserved portions for allocating the pilots;

wherein when the number of the pilot streams is 6, the number of the subcarriers of each resource unit is 18 and the number of the OFDM symbols of each resource unit is 7;

wherein the pilots for a 1st pilot stream are arranged respectively at a 2nd subcarrier on a 1st symbol, at a 13th subcarrier on a 6th symbol, at a 23rd subcarrier on a 2nd symbol, and at a 34th subcarrier on a 5th symbol;

wherein the pilots for a 2nd pilot stream are arranged respectively at a 3rd subcarrier on the 1st symbol, at a 14th subcarrier on the 6th symbol, at a 24th subcarrier on the 2nd symbol, and at a 35th subcarrier on the 5th symbol;

wherein the pilots for a 3rd pilot stream are arranged respectively at the 2nd subcarrier on the 5th symbol, at the 13th subcarrier on the 2nd symbol, at the 23rd subcarrier on the 6th symbol, and at the 34th subcarrier on the 1st symbol;

wherein the pilots for a 4th pilot stream are arranged respectively at the 3rd subcarrier on the 5th symbol, at the 14th subcarrier on the 2nd symbol, at the 24th subcarrier on the 6th symbol, and at the 35th subcarrier on the 1st symbol;

wherein the pilots for a 5th pilot stream are arranged respectively at the 2nd subcarrier on the 2nd symbol, at the 13th subcarrier on the 5th symbol, at the 23rd subcarrier on the 1st symbol, and at the 34th subcarrier on the 6th symbol; and wherein the pilots for a 6th pilot stream are arranged respectively at the 3rd subcarrier on the 2nd symbol, at the 14th subcarrier on the 5th symbol, at the 24th subcarrier on the 1st symbol, and at the 35th subcarrier on the 6th symbol.

51. A wireless communication system using orthogonal frequency division multiplexing (OFDM) modulation, comprising:
a multiple-input-multiple-output (MIMO) antenna;
an OFDM modulator operably connected to the MIMO antenna; and
a processor operably connected to the OFDM modulator, wherein the processor is configured to provide two contiguous resource unit, and each of the two resource unit comprising OFDM symbols in time domain and subcarriers in frequency domain, and to allocate two pilots for each of multiple pilot streams in one resource unit, wherein the pilots location for the pilot streams in a second resource unit is corresponding to the pilot allocation in a first resource unit;
wherein the processor further groups the pilot streams into two pilot stream clusters, and groups pilots for each pilot stream cluster into two pilot clusters, and allocates the pilot clusters for a first pilot stream cluster and a second pilot stream cluster according to a predefined pattern of reserved portions for allocating the pilots;
wherein when the number of the pilot streams is 5, the number of the subcarriers of each resource unit is 18 and the number of the OFDM symbols of each resource unit is 6;
wherein the pilots for a 1st pilot stream are arranged respectively at a 2nd subcarrier on a 1st symbol, at a 13th subcarrier on a 6th symbol, at a 23rd subcarrier on a 2nd symbol, and at a 34th subcarrier on a 5th symbol;
wherein the pilots for a 2nd pilot stream are arranged respectively at a 3rd subcarrier on the 1st symbol, at a 14th subcarrier on the 6th symbol, at a 24th subcarrier on the 2nd symbol, and at a 35th subcarrier on the 5th symbol;
wherein the pilots for a 3rd pilot stream are arranged respectively at the 2nd subcarrier on the 5th symbol, at the 13th subcarrier on the 2nd symbol, at the 23rd subcarrier on the 6th symbol, and at the 34th subcarrier on the 1st symbol;
wherein the pilots for a 4th pilot stream are arranged respectively at the 3rd subcarrier on the 5th symbol, at the 14th subcarrier on the 2nd symbol, at the 24th subcarrier on the 6th symbol, and at the 35th subcarrier on the 1st symbol; and
wherein the pilots for a 5th pilot stream are arranged respectively at the 2nd subcarrier on the 2nd symbol, at the 13th subcarrier on the 5th symbol, at the 23rd subcarrier on the 1st symbol, and at the 34th subcarrier on the 6th symbol.

52. A wireless communication system using orthogonal frequency division multiplexing (OFDM) modulation, comprising:
a multiple-input-multiple-output (MIMO) antenna;
an OFDM modulator operably connected to the MIMO antenna; and
a processor operably connected to the OFDM modulator, wherein the processor is configured to provide two contiguous resource unit, and each of the two resource unit comprising OFDM symbols in time domain and subcarriers in frequency domain, and to allocate two pilots for each of multiple pilot streams in one resource unit, wherein the pilots location for the pilot streams in a second resource unit is corresponding to the pilot allocation in a first resource unit;
wherein the processor further groups the pilot streams into two pilot stream clusters, and groups pilots for each pilot stream cluster into two pilot clusters, and allocates the pilot clusters for a first pilot stream cluster and a second pilot stream cluster according to a predefined pattern of reserved portions for allocating the pilots;
wherein when the number of the pilot streams is 5, the number of the subcarriers of each resource unit is 18 and the number of the OFDM symbols of each resource unit is 5;
wherein the pilots for a 1st pilot stream are arranged respectively at a 2nd subcarrier on a 1st symbol, at a 13th subcarrier on a 5th symbol, at a 23rd subcarrier on a 2nd symbol, and at a 34th subcarrier on a 4th symbol;
wherein the pilots for a 2nd pilot stream are arranged respectively at a 3rd subcarrier on the 1st symbol, at a 14th subcarrier on the 5th symbol, at a 24th subcarrier on the 2nd symbol, and at a 35th subcarrier on the 4th symbol;
wherein the pilots for a 3rd pilot stream are arranged respectively at the 2nd subcarrier on the 4th symbol, at the 13th subcarrier on the 2nd symbol, at the 23rd subcarrier on the 5th symbol, and at the 34th subcarrier on the 1st symbol;
wherein the pilots for a 4th pilot stream are arranged respectively at the 3rd subcarrier on the 4th symbol, at the 14th subcarrier on the 2nd symbol, at the 24th subcarrier on the 5th symbol, and at the 35th subcarrier on the 1st symbol; and
wherein the pilots for a 5th pilot stream are arranged respectively at the 2nd subcarrier on the 2nd symbol, at the 13th subcarrier on the 4th symbol, at the 23rd subcarrier on the 1st symbol, and at the 34th subcarrier on the 5th symbol.

53. A wireless communication system using orthogonal frequency division multiplexing (OFDM) modulation, comprising:
a multiple-input-multiple-output (MIMO) antenna;
an OFDM modulator operably connected to the MIMO antenna; and
a processor operably connected to the OFDM modulator, wherein the processor is configured to provide two contiguous resource unit, and each of the two resource unit comprising OFDM symbols in time domain and subcarriers in frequency domain, and to allocate two pilots for each of multiple pilot streams in one resource unit, wherein the pilots location for the pilot streams in a second resource unit is corresponding to the pilot allocation in a first resource unit;

wherein the processor further groups the pilot streams into two pilot stream clusters, and groups pilots for each pilot stream cluster into two pilot clusters, and allocates the pilot clusters for a first pilot stream cluster and a second pilot stream cluster according to a predefined pattern of reserved portions for allocating the pilots:

wherein when the number of the pilot streams is 5, the number of the subcarriers of each resource unit is 18 and the number of the OFDM symbols of each resource unit is 7;

wherein the pilots for a 1st pilot stream are arranged respectively at a 2nd subcarrier on a 1st symbol, at a 13th subcarrier on a 6th symbol, at a 23rd subcarrier on a 2nd symbol, and at a 34th subcarrier on a 5th symbol;

wherein the pilots for a 2nd pilot stream are arranged respectively at a 3rd subcarrier on the 1st symbol, at a 14th subcarrier on the 6th symbol, at a 24th subcarrier on the 2nd symbol, and at a 35th subcarrier on the 5th symbol;

wherein the pilots for a 3rd pilot stream are arranged respectively at the 2nd subcarrier on the 5th symbol, at the 13th subcarrier on the 2nd symbol, at the 23rd subcarrier on the 6th symbol, and at the 34th subcarrier on the 1st symbol;

wherein the pilots for a 4th pilot stream are arranged respectively at the 3rd subcarrier on the 5th symbol, at the 14th subcarrier on the 2nd symbol, at the 24th subcarrier on the 6th symbol, and at the 35th subcarrier on the 1st symbol; and wherein the pilots for a 5th pilot stream are arranged respectively at the 2nd subcarrier on the 2nd symbol, at the 13th subcarrier on the 5th symbol, at the 23rd subcarrier on the 1st symbol, and at the 34th subcarrier on the 6th symbol.

* * * * *